(12) United States Patent
Stamatakis et al.

(10) Patent No.: US 12,207,341 B2
(45) Date of Patent: Jan. 21, 2025

(54) METHOD AND APPARATUS FOR ENABLING A VIRTUAL BUILDING MANAGEMENT SYSTEM

(71) Applicant: Senseware, Inc., Vienna, VA (US)

(72) Inventors: Julien G. Stamatakis, Centreville, VA (US); Thomas Hoffmann, Herndon, VA (US); Nathan A. Sacks, Golden, CO (US)

(73) Assignee: Senseware, Inc., Vienna, VA (US)

( * ) Notice: Subject to any disclaimer, the term of this patent is extended or adjusted under 35 U.S.C. 154(b) by 0 days.

(21) Appl. No.: 18/513,766

(22) Filed: Nov. 20, 2023

(65) Prior Publication Data

US 2024/0089719 A1 Mar. 14, 2024

Related U.S. Application Data

(63) Continuation of application No. 17/962,931, filed on Oct. 10, 2022, now Pat. No. 11,825,547, which is a continuation of application No. 17/062,561, filed on Oct. 3, 2020, now Pat. No. 11,470,462, which is a continuation of application No. 16/207,095, filed on Dec. 1, 2018, now Pat. No. 10,798,554, which is a continuation of application No. 15/264,697, filed on Sep. 14, 2016, now Pat. No. 10,149,141, which is a continuation-in-part of application No. 14/926,089, filed on Oct. 29, 2015, now Pat. No. 10,652,767, which is a continuation-in-part of application No. 14/871,014, filed on Sep. 30, 2015, now Pat. No. 9,876,653, which is a continuation-in-part of
(Continued)

(51) Int. Cl.
*H04W 8/00* (2009.01)
*H04L 12/28* (2006.01)
*H04L 41/0806* (2022.01)
*H04L 67/10* (2022.01)
*H04L 67/12* (2022.01)

(52) U.S. Cl.
CPC .......... *H04W 8/005* (2013.01); *H04L 12/2807* (2013.01); *H04L 41/0806* (2013.01); *H04L 67/10* (2013.01); *H04L 67/12* (2013.01)

(58) Field of Classification Search
CPC ........ H04W 8/00; H04W 8/005; H04L 12/26; H04L 29/08; H04L 41/0806; H04L 12/2807; H04L 67/10; H04L 67/12
See application file for complete search history.

(56) References Cited

U.S. PATENT DOCUMENTS 5,341,988 A 8/1994 Rein
6,584,113 B1 6/2003 Manduley
7,191,097 B1 3/2007 Lee
(Continued)

FOREIGN PATENT DOCUMENTS

CN 103687076 3/2014

OTHER PUBLICATIONS

Cloud Logger, 38 Zeros, 2015.
(Continued)

*Primary Examiner* — Kyaw Z Soe

(57) ABSTRACT

A system, method and apparatus for integrated building operations management. Nodes in the sensor network can be configured to interface with a building control system to exchange sensor-related information.

20 Claims, 13 Drawing Sheets

Related U.S. Application Data application No. 14/710,170, filed on May 12, 2015, now Pat. No. 9,551,594.

(60) Provisional application No. 62/136,959, filed on Mar. 23, 2015, provisional application No. 61/992,307, filed on May 13, 2014.

(56) References Cited

U.S. PATENT DOCUMENTS

| | | | |
|---|---|---|---|
| 7,379,981 B2 | 5/2008 | Elliott et al. | |
| 8,103,389 B2 | 1/2012 | Golden et al. | |
| 8,325,637 B2 | 12/2012 | Salsbury | |
| 8,339,069 B2 | 12/2012 | Chemel | |
| 8,527,096 B2 | 9/2013 | Pavlak | |
| 8,527,626 B1 | 9/2013 | Wang | |
| 8,548,630 B2 | 10/2013 | Grohman | |
| 8,855,825 B2 | 10/2014 | Grohman | |
| 8,892,797 B2 | 11/2014 | Grohman | |
| 9,534,929 B1 | 1/2017 | Stamatakis et al. | |
| 9,534,930 B1 | 1/2017 | Stamatakis | |
| 9,538,578 B1 | 1/2017 | Stamatakis et al. | |
| 9,551,594 B1 | 1/2017 | Stamatakis | |
| 9,554,236 B1 | 1/2017 | Stamatakis | |
| 9,714,843 B1 | 7/2017 | Stamatakis et al. | |
| 9,714,844 B1 | 7/2017 | Stamatakis et al. | |
| 9,715,239 B2 | 7/2017 | Fadell | |
| 9,756,511 B1 | 9/2017 | Stamatakis et al. | |
| 9,762,979 B1 | 9/2017 | Stamatakis et al. | |
| 9,763,118 B1 | 9/2017 | Stamatakis et al. | |
| 9,800,646 B1 | 10/2017 | Stamatakis et al. | |
| 9,813,489 B1 | 11/2017 | Stamatakis et al. | |
| 9,876,653 B1 | 1/2018 | Stamatakis | |
| 9,888,336 B1 | 2/2018 | Stamatakis | |
| 9,942,693 B2 | 4/2018 | Stamatakis | |
| 9,986,411 B1 | 5/2018 | Stamatakis | |
| 10,142,196 B1 | 11/2018 | Stamatakis et al. | |
| 10,143,038 B1 | 11/2018 | Stamatakis | |
| 10,149,141 B1 | 12/2018 | Stamatakis et al. | |
| 10,171,891 B1 | 1/2019 | Stamatakis | |
| 10,171,972 B2 | 1/2019 | Stamatakis et al. | |
| 10,178,638 B1 | 1/2019 | Stamatakis et al. | |
| 10,237,631 B2 | 3/2019 | Stamatakis et al. | |
| 10,263,841 B1 | 4/2019 | Stamatakis et al. | |
| 10,313,149 B2 | 6/2019 | Stamatakis | |
| 10,313,197 B1 | 6/2019 | Stamatakis | |
| 10,334,417 B2 | 6/2019 | Stamatakis et al. | |
| 10,536,838 B2 | 1/2020 | Stamatakis | |
| 10,542,331 B2 | 1/2020 | Stamatakis | |
| 10,652,767 B1 | 5/2020 | Stamatakis | |
| 10,687,231 B1 | 6/2020 | Stamatakis | |
| 10,798,554 B2 | 10/2020 | Stamatakis et al. | |
| 10,805,697 B2 | 10/2020 | Stamatakis et al. | |
| 10,833,893 B2 | 11/2020 | Stamatakis et al. | |
| 10,932,319 B2 | 2/2021 | Stamatakis | |
| 10,951,961 B2 | 3/2021 | Stamatakis et al. | |
| 10,992,493 B2 | 4/2021 | Stamatakis | |
| 10,993,097 B1 | 4/2021 | Stamatakis et al. | |
| 11,089,388 B2 | 8/2021 | Stamatakis et al. | |
| 11,089,390 B2 | 8/2021 | Stamatakis | |
| 11,184,257 B2 | 11/2021 | Stamatakis et al. | |
| 11,197,146 B2 | 12/2021 | Stamatakis et al. | |
| 11,259,099 B2 | 2/2022 | Stamatakis et al. | |
| 11,457,292 B2 | 9/2022 | Stamatakis et al. | |
| 11,470,462 B2 | 10/2022 | Stamatakis et al. | |
| 11,509,976 B2 | 11/2022 | Stamatakis et al. | |
| 11,528,161 B2 | 12/2022 | Stamatakis | |
| 11,546,677 B2 | 1/2023 | Stamatakis | |
| 11,595,926 B2 | 2/2023 | Stamatakis et al. | |
| 11,617,027 B2 | 3/2023 | Stamatakis et al. | |
| 11,683,616 B2 | 6/2023 | Stamatakis | |
| 11,722,365 B2 | 8/2023 | Stamatakis et al. | |
| 11,757,738 B2 | 9/2023 | Stamatakis et al. | |
| 11,765,489 B2 | 9/2023 | Stamatakis et al. | |
| 11,765,490 B2 | 9/2023 | Stamatakis et al. | |
| 11,812,288 B2 | 11/2023 | Stamatakis | |
| 11,817,966 B2 | 11/2023 | Stamatakis | |
| 11,825,547 B2 | 11/2023 | Stamatakis et al. | |
| 11,843,511 B2 | 12/2023 | Stamatakis | |
| 2002/0144537 A1 | 10/2002 | Sharp | |
| 2002/0173704 A1 | 11/2002 | Schulze | |
| 2003/0028336 A1 | 2/2003 | Masar | |
| 2005/0054289 A1 | 3/2005 | Salazar | |
| 2006/0031934 A1 | 2/2006 | Kriegel | |
| 2006/0067209 A1 | 3/2006 | Sheehan | |
| 2006/0077607 A1 | 4/2006 | Henricks | |
| 2006/0234621 A1 | 10/2006 | Desrochers | |
| 2007/0069850 A1 | 3/2007 | Anderson | |
| 2007/0211681 A1 | 9/2007 | Sun et al. | |
| 2007/0225954 A1 | 9/2007 | Kodesky | |
| 2007/0232288 A1 | 10/2007 | McFarland | |
| 2007/0233323 A1 | 10/2007 | Wiemeyer | |
| 2008/0116054 A1 | 5/2008 | Leach | |
| 2008/0195757 A1 | 8/2008 | Kim | |
| 2008/0240105 A1 | 10/2008 | Abdallah | |
| 2009/0033513 A1 | 2/2009 | Salsbury | |
| 2009/0271042 A1 | 10/2009 | Voysey | |
| 2010/0011340 A1 | 1/2010 | Pandey | |
| 2010/0070086 A1 | 3/2010 | Harrod | |
| 2010/0083356 A1 | 4/2010 | Steckley | |
| 2010/0141153 A1 | 6/2010 | Recker | |
| 2010/0231386 A1 | 9/2010 | Barnes | |
| 2010/0274366 A1 | 10/2010 | Fata | |
| 2010/0327766 A1 | 12/2010 | Recker | |
| 2011/0034120 A1 | 2/2011 | Jaiyeola | |
| 2011/0040809 A1 | 2/2011 | Spanier | |
| 2011/0131320 A1 | 6/2011 | Hong | |
| 2011/0157366 A1 | 6/2011 | Padmanabh | |
| 2011/0248857 A1 | 10/2011 | Rutherford | |
| 2011/0255454 A1 | 10/2011 | Hauser | |
| 2011/0276738 A1 | 11/2011 | Kim | |
| 2012/0098445 A1 | 4/2012 | Park | |
| 2012/0299509 A1 | 4/2012 | Lee | |
| 2012/0203508 A1 | 8/2012 | Hamzaoui | |
| 2012/0310599 A1 | 12/2012 | Tanaka | |
| 2013/0086195 A1 | 4/2013 | Hiniker | |
| 2013/0178195 A1 | 7/2013 | Luna | |
| 2013/0201316 A1 | 8/2013 | Binder | |
| 2014/0085102 A1 | 3/2014 | McCormick | |
| 2014/0126581 A1 | 5/2014 | Wang | |
| 2014/0207290 A1* | 7/2014 | Crawford | G05D 23/1917 700/276 |
| 2014/0266669 A1 | 9/2014 | Fadell | |
| 2014/0278260 A1 | 9/2014 | Gettings | |
| 2014/0282458 A1 | 9/2014 | Gupta | |
| 2014/0293993 A1 | 10/2014 | Ryhorchuk | |
| 2014/0334653 A1 | 11/2014 | Luna | |
| 2014/0340222 A1 | 11/2014 | Thornton | |
| 2014/0359133 A1 | 12/2014 | Tian | |
| 2015/0021988 A1 | 1/2015 | Barnetson | |
| 2015/0029022 A1 | 1/2015 | Stebbins | |
| 2015/0043411 A1 | 2/2015 | Kim | |
| 2015/0097961 A1 | 4/2015 | Ure | |
| 2015/0106447 A1* | 4/2015 | Hague | H04L 12/2836 709/204 |
| 2015/0108901 A1 | 4/2015 | Greene | |
| 2015/0134123 A1 | 5/2015 | Obinelo | |
| 2015/0156286 A1 | 6/2015 | Blair | |
| 2015/0264138 A1 | 9/2015 | Watts | |
| 2015/0312696 A1 | 10/2015 | Ribbich | |
| 2015/0316907 A1 | 11/2015 | Elbsat | |
| 2015/0316945 A1 | 11/2015 | Soya | |
| 2015/0327010 A1 | 11/2015 | Gottschalk | |
| 2015/0362928 A1 | 12/2015 | Schmidlin | |
| 2016/0019763 A1 | 1/2016 | Raji | |
| 2016/0112518 A1 | 4/2016 | Haleem et al. | |
| 2016/0193895 A1 | 7/2016 | Aich | |
| 2016/0195856 A1 | 7/2016 | Spero | |
| 2016/0335731 A1 | 11/2016 | Hall | |
| 2016/0366010 A1 | 12/2016 | Hamber | |
| 2017/0048376 A1 | 2/2017 | Logan | |

(56) References Cited

U.S. PATENT DOCUMENTS

2017/0093700 A1 3/2017 Gilley
2017/0155851 A1 6/2017 Van Laere

OTHER PUBLICATIONS

Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxture Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, Spin Wave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
Dolphin Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
ISelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.
Office Action, U.S. Appl. No. 14/710,170, mailed Jul. 19, 2016.
Office Action, U.S. Appl. No. 15/145,871, mailed Sep. 30, 2016.
First Action Interview Pilot Program Pre-Interview Communication, U.S. Appl. No. 14/710,209, mailed Oct. 25, 2016.
First Action Interview Pilot Program Pre-Interview Communication, U.S. Appl. No. 14/926,118, mailed Jul. 11, 2017.
First Action Interview Pilot Program Pre-Interview Communication, U.S. Appl. No. 14/926,089, mailed Jun. 19, 2017.
Notice of Allowance, U.S. Appl. No. 14/871,014, mailed Aug. 1, 2017.
Office Action, U.S. Appl. No. 15/389,626, mailed Jul. 14, 2017.
First Action Interview Pilot Program Pre-Interview Communication, U.S. Appl. No. 14/871,014, mailed May 31, 2017.
Office Action, U.S. Appl. No. 13/344,667, mailed Sep. 26, 2017.
Office Action, U.S. Appl. No. 14/926,118, mailed Oct. 4, 2017.
Office Action, U.S. Appl. No. 14/926,089, mailed Nov. 13, 2017.
Notice of Allowance, U.S. Appl. No. 14/926,089, mailed Jul. 26, 2018.
Office Action, U.S. Appl. No. 14/926,118, mailed Sep. 5, 2018.
Office Action, U.S. Appl. No. 15/917,627, mailed Aug. 2, 2019.
Notice of Allowance, U.S. Appl. No. 14/926,118, mailed Feb. 12, 2020.
Notice of Allowance, U.S. Appl. No. 16/207,094, mailed Feb. 10, 2020.
Notice of Allowance, U.S. Appl. No. 16/418,247, mailed Sep. 4, 2020.
Office Action, U.S. Appl. No. 16/867,661, mailed Feb. 3, 2021.
Office Action, U.S. Appl. No. 16/895,244, mailed Jul. 22, 2021.
Notice of Allowance, U.S. Appl. No. 17/240,146, mailed Aug. 5, 2022.
Office Action, U.S. Appl. No. 17/089,804, mailed May 23, 2023.
Final Office Action, U.S. Appl. No. 17/089,804, mailed Sep. 23, 2023.
Office Action, U.S. Appl. No. 18/092,353, mailed Jan. 18, 2024.

* cited by examiner

METHOD AND APPARATUS FOR ENABLING A VIRTUAL BUILDING MANAGEMENT SYSTEM

This application is a continuation of non-provisional application Ser. No. 17/962,931, filed Oct. 10, 2022, which is a continuation of non-provisional application Ser. No. 17/062,561, filed Oct. 3, 2020 (now U.S. Pat. No. 11,470,462), which is a continuation of non-provisional application Ser. No. 16/207,095, filed Dec. 1, 2018 (now U.S. Pat. No. 10,798,554), which is a continuation of non-provisional application Ser. No. 15/264,697, filed Sep. 14, 2016 (now U.S. Pat. No. 10,149,141), which is a continuation-in-part of non-provisional application Ser. No. 14/926,089, filed Oct. 29, 2015 (now U.S. Pat. No. 10,652,767), which is a continuation-in-part of non-provisional application Ser. No. 14/871,014, filed Sep. 30, 2015 (now U.S. Pat. No. 9,876,653), which is a continuation-in-part of non-provisional application Ser. No. 14/710,170, filed May 12, 2015 (now U.S. Pat. No. 9,551,594). Non-provisional application Ser. No. 14/710,170 claims the benefit of and priority to provisional application No. 61/992,307, filed May 13, 2014, and to provisional application No. 62/136,959, filed Mar. 23, 2015. Each of the above-identified applications is incorporated herein by reference in its entirety.

BACKGROUND

Field

The present disclosure relates generally to sensor applications, including a system, method and apparatus for integrated building operations management.

Introduction

Sensors can be used to monitor various conditions at a monitored location such as a building. In one example, sensors can be used to monitor physical environment conditions such as temperature, humidity, and air quality. In another example, sensors can be used to monitor physical environment conditions such as consumption of a particular utility (e.g., power). The application of sensors within the building context is growing as the utility provided by such monitoring expands.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Figure 1:
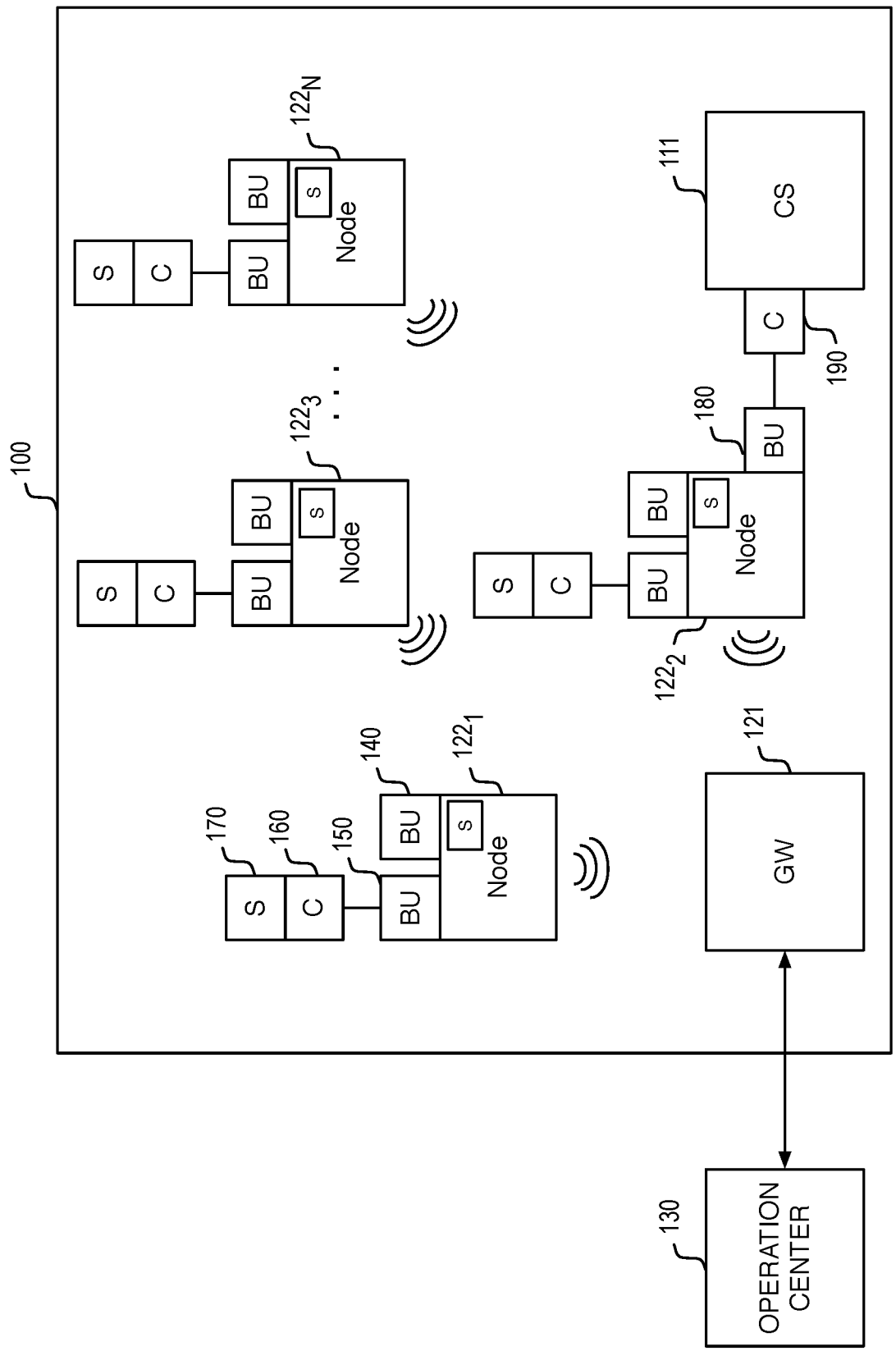
FIG. 1 illustrates an example embodiment of integrating sensors with a control system.

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

A Building Management System (BMS) is an example of a computer-based control system installed in a building. In general, a computer-based control system can monitor and control some aspect of a building's functionality. A BMS, for example, can be designed to monitor and control the building's mechanical and electrical equipment such as ventilation, lighting, power systems, fire systems, and security systems. Other examples of computer-based control systems installed in a building include a Building Automation System (BAS), a Facility Management Systems (FMS), an Energy Management Systems (EMS), a Maintenance Management System (MMS), or any other control system installed in a building that can leverage input information based on sensor measurements.

A building control system such as a BMS is a combination of hardware and software and is typically proprietary. For example, a BMS can be installed during the building construction phase as it is tied in with the installation of extensive mechanical, HVAC, electrical, and plumbing systems. Due in part to its scale of operation, the BMS is often rigidly configured or incomplete in its reach. This results because the BMS may not be installed with the sufficient level of granularity to enable fine-tuning of its operation to meet the particular needs of a building site. Further problematic is the prohibitive expense of adjusting or modifying the proprietary BMS. In general, the BMS can be inflexible in adapting to the dynamic nature of the on-site needs as the building usage evolves over time. This can be especially true when considering the need for increasing the number of sensors at a building site.

The reach of a control system can be incomplete because a plurality of sensors may not yet be integrated with the control system. This lack of integration can result from the inflexibility of the control system in adapting to the changing sensor application needs at the monitored location. In the example of a BMS, the changing sensor application needs can represent the addition of new sensors in a building that respond to new government regulations, that respond to sensor needs in new locations, that respond to new tenant requirements, that incorporate new sensor technology, that incorporate new sensor interfaces, or that achieves any new sensor objective that is beyond the scope of the BMS as initially installed or currently operated. As noted, BMS installations can be inflexible and require significant expense to modify or otherwise adjust its operation. This significant expense will often preclude the integration of sensors with the BMS, thereby reducing the overall return on the original investment in the BMS.

In the present disclosure, it is recognized that a sensor network platform can be used to augment the existing functionality of a building control system at a monitored location. FIG. 1 illustrates an example embodiment. In the example embodiment, gateway device 121 is installed at monitored location 100 with a network connection with operation center 130 located external to monitored location 100. This network connection can be embodied in various forms depending upon the particular characteristics of monitored location 100. For example, where monitored location 100 is a building in a developed area, then the network connection can be facilitated by a wired Internet connection via an Internet service provider (ISP). Where monitored location 100 is a remote physical area (or movable area), then the network connection can be facilitated by a terrestrial-based or satellite-based wireless network. Here, it should be noted that multiple gateways can be used at a particular monitored location, wherein each gateway supports a different set of sensors and has a separate network connection to an operation center.

In general, a monitored location can represent any area where one or more sensors are deployed. The monitored location may or may not represent a physical area having clearly defined boundaries. As would be appreciated, the extent of the sensor application itself provides a sense of boundary to the monitored location. In one example, the monitored location can represent a building such as a home, hotel, industrial facility, school, hospital, community building, stadium, airport, convention center, warehouse, office building, mall, shopping center, data center, multi-dwelling unit, or other defined building structure. In another example, the monitored location can represent an area of control such as a vehicle or container in any mode of transport, an asset collection area, a construction zone, or any monitored area that can be fixed or movable. In yet another example, the monitored location can represent an area proximate to an article, device, person or other item of interest upon which one or more sensors are attached.

Gateway device 121 can communicate with a plurality of sensor network nodes $122_1$-$122_N$, wherein each sensor network node can support one or more non-integrated sensors. Sensor network nodes $122_n$ can communicate with gateway 121 via wired or wireless communication. To illustrate the various ways that a sensor network node can support one or more sensors, consider the example of sensor network node $122_1$. First, one or more sensors (S) can be integrated with sensor network node $122_1$. Second, one or more sensors can be supported by bridge unit (BU) 140, which can be configured for attachment to sensor network node $122_1$. Third, one or more sensors can be supported by bridge unit 150, which communicates with an external controller 160 that supports one or more sensors 170. In one embodiment, communication between a bridge unit and an external controller can be based on an industry-defined protocol. For example, the interface can be based on Modbus, BACnet, LonWorks, or any other industry-defined interface specification.

Whether from internal sensors or from sensors supported by one or more bridge units attached to a sensor network node, data based on sensor measurements can be collected by a sensor network node and transmitted to operation center 130 for storage in a database. As an example, sensor network node $122_1$ can collect data based on measurements by sensors integrated with sensor network node $122_1$, can collect data based on measurements by sensors supported by bridge unit 140, and can collect data based on measurements by sensors supported by bridge unit 150. The collected data based on measurements by these various supported sensors can be transmitted to operation center 130 via gateway 121. Operation center 130 can then store the collected data in a database for subsequent retrieval and visualization of physical conditions at the monitored location.

The data collected by sensor network node $122_1$ can represent sensor data that has not been integrated with control system 111. This lack of integration can lead to fractured building operations because it is based on an incomplete set of sensor data. In one embodiment, operation center 130 can be configured to process the collected sensor data to produce customized sensor information based on the non-integrated sensors for presentation to a known interface supported by control system 111. In general, the customized sensor information can be designed to produce actionable information for use by control system 111 as part of a unified, integrated building operations process.

In one example, the customized information can represent sensor measurement data that has been conditioned for use by control system 111. In one scenario, operation center 130 can smooth a stream of sensor data by presenting a moving average of sensor data. The smoothed or otherwise conditioned data can prevent control system 111 from performing unwarranted response actions upon the occurrence of spurious sensor data readings.

In another example, operation center 130 can be configured to transform multiple sensor data values into a transformed data value. In one scenario, operation center 130 can generate a power measurement data value based on a voltage measurement data value and a current measurement data value. Here, it should be noted that operation center 130 can be configured to perform complex conversion functions that may not be supported by a device that performed the sensor measurements.

In yet another example, operation center 130 can be configured to transform multiple sensor data values into information reflective of custom analytics. In a simple scenario, operation center 130 can be configured to analyze collected sensor data relative to a threshold value. This alert function can be applied to a single stream of collected data. In a more complex scenario, an alert function can be defined that analyzes a composite of multiple data values. For example, the alert function can analyze a moving average, a rate of change, or any factor inclusive of multiple data values to determine whether an alert should be triggered. In one scenario, the custom analytics can be configured to monitor the operation of equipment at a monitored location to determine whether a maintenance action should be scheduled. As would be appreciated, these examples are not intended to be limiting of the scope of the present disclosure. In general, the particular form of the alert function would be implementation dependent. Operation center 130 can be configured to process collected data to produce any form or type of information needed by control system 111. Thus, the particular processing performed by operation center 130 would be dependent on the needs and capabilities of control system 111 and the sensor application implemented.

The processing of collected sensor data can produce customized sensor information for presentation to control system 111. The customized sensor information can be transmitted by operation center 130 to gateway 121. Gateway 121 can then forward the customized sensor information to sensor network node 1222 via the sensor network node communication infrastructure. Sensor network node 1222 can be configured to interface with control system 111 via bridge unit 180 to present the customized information to control system 111 through a supporting interface controller 190 (e.g., Modbus, BACnet, or other building communication protocol) for control system 111.

Figure 2:
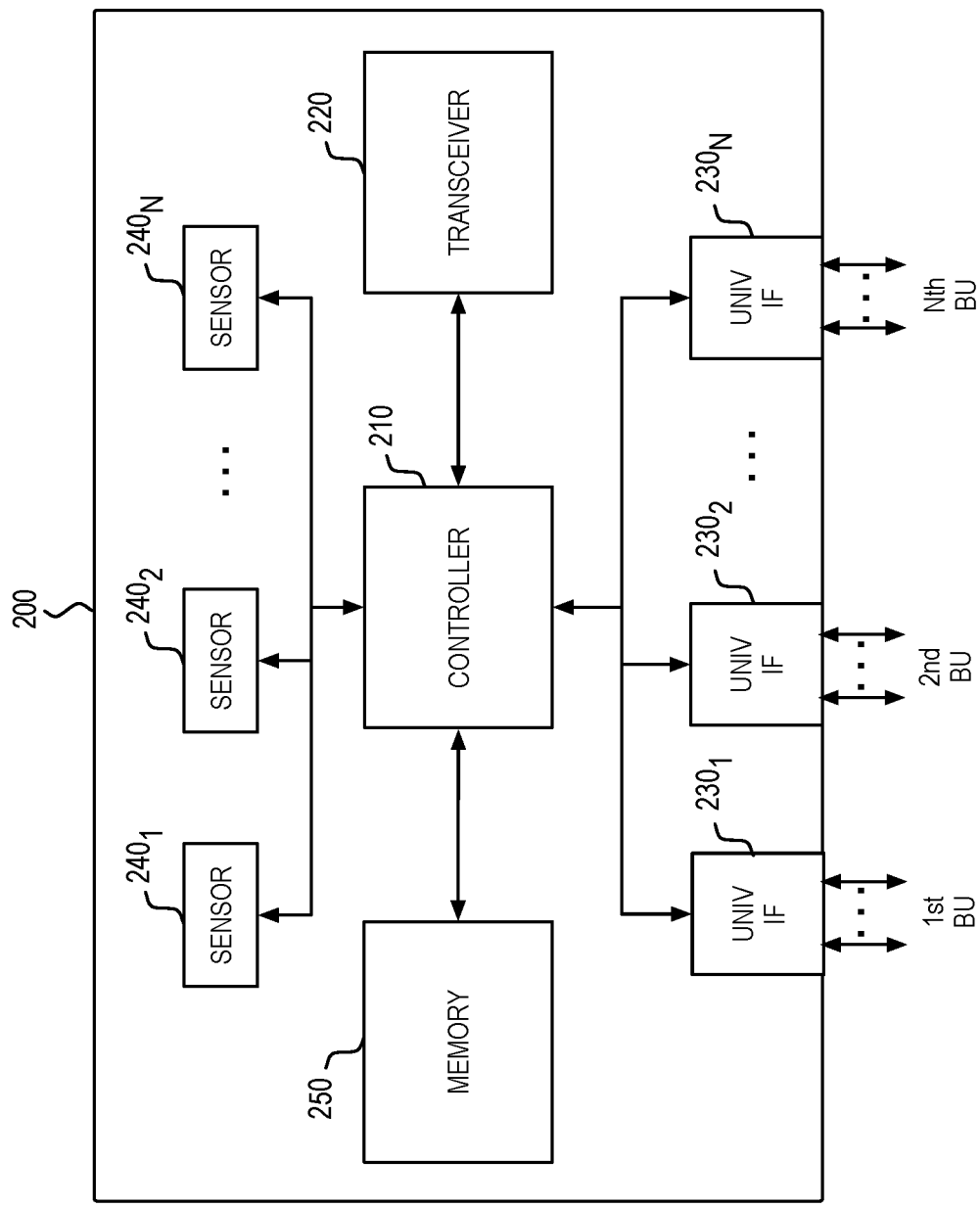
FIG. 2 illustrates an example embodiment of a node in a sensor network.

FIG. 2 illustrates an example embodiment of a sensor network node that can provide varied support for one or more sensors. As illustrated, sensor network node 200 includes transceiver 220, which can support wired or wireless communication. The use of wireless communication enables sensor network node 200 to be installed at locations that are remote from the network infrastructure used by the control system. In one embodiment, a plurality of sensor network nodes can form a wireless mesh network using the IEEE 802.15.4 protocol. This wireless mesh network enables sensor network node 200 to communicate with a gateway or another sensor network node that operates as a relay between sensor network node 200 and the gateway. Where wired communication is supported, sensor network node 200 can be configured to communicate with another sensor network node, a gateway or an operation center.

Controller 210 can collect data based on measurements by a plurality of sensors $240_1$-$240_N$ that are contained within or otherwise supported by sensor network node 200. In one embodiment, the plurality of sensors $240_1$-$240_N$ integrated with sensor network node 200 can include a temperature sensor, a humidity sensor, an air quality (e.g., $CO_2$) sensor, a light sensor, a sound sensor, a battery voltage sensor, or any other sensor that can be supported by sensor network node 200. In general, the plurality of sensors $240_1$-$240_N$ can facilitate monitoring of the physical environment at that part of the monitored location, including the health and/or status of sensor network node 200.

A sensor network node can also collect sensor measurements from one or more sensors via bridge units. As illustrated in FIG. 2, controller 210 can collect data from a set of bridge units that are connected to sensor network node 200 via one or more of a plurality of universal sensor interfaces $230_1$-$230_N$. Each universal sensor interface $230_n$ can support the connection of sensor network node 200 with a separate bridge unit. The plug-and-play universal sensor interface facilitates the separation of the sensor network node communication infrastructure from the set of one or more bridge units that are deployed at the location at which the supporting sensor network node is installed. This separation creates significant flexibility in providing customized sensor application solutions after installation of the control system.

Universal sensor interfaces $230_n$ can represent a combination of hardware and software. The hardware portion of a universal sensor interfaces $230_n$ can include a wired interface that enables communication of different signals between sensor network node 200 and a connected bridge unit. In one example, the wired interface can be enabled through a connector interface, which is exposed by the housing of sensor network node 200, and that is configured to receive a bridge unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in sensor network node 200 to select the particular bridge unit with which sensor network node 200 desires to communicate.

The software portion of a universal sensor interface $230_n$ can include a protocol that allows sensor network node 200 to communicate with a bridge unit. In one example protocol, controller 210 can be configured to poll the various universal sensor interfaces $230_1$-$230_N$ to determine whether any bridge units are connected. As part of this protocol, controller 210 can first request a sensor ID from a bridge unit. If the response read is "0", then controller 210 would know that no bridge unit is connected to that universal sensor interface $230_n$. If, on the other hand, the response read is not "0", then controller 210 would ask for the number of data values that have to be retrieved and the number of bits on which the data values are coded. In one example, the higher order 8-bits of a 16-bit communication between controller 210 and a bridge unit identifies the number of data values, while the lower order 8-bits of the 16-bit communication identifies the number of bits used to code each data value. Based on the number of data values to be retrieved, controller 210 would then collect that number of data values.

Figure 3:
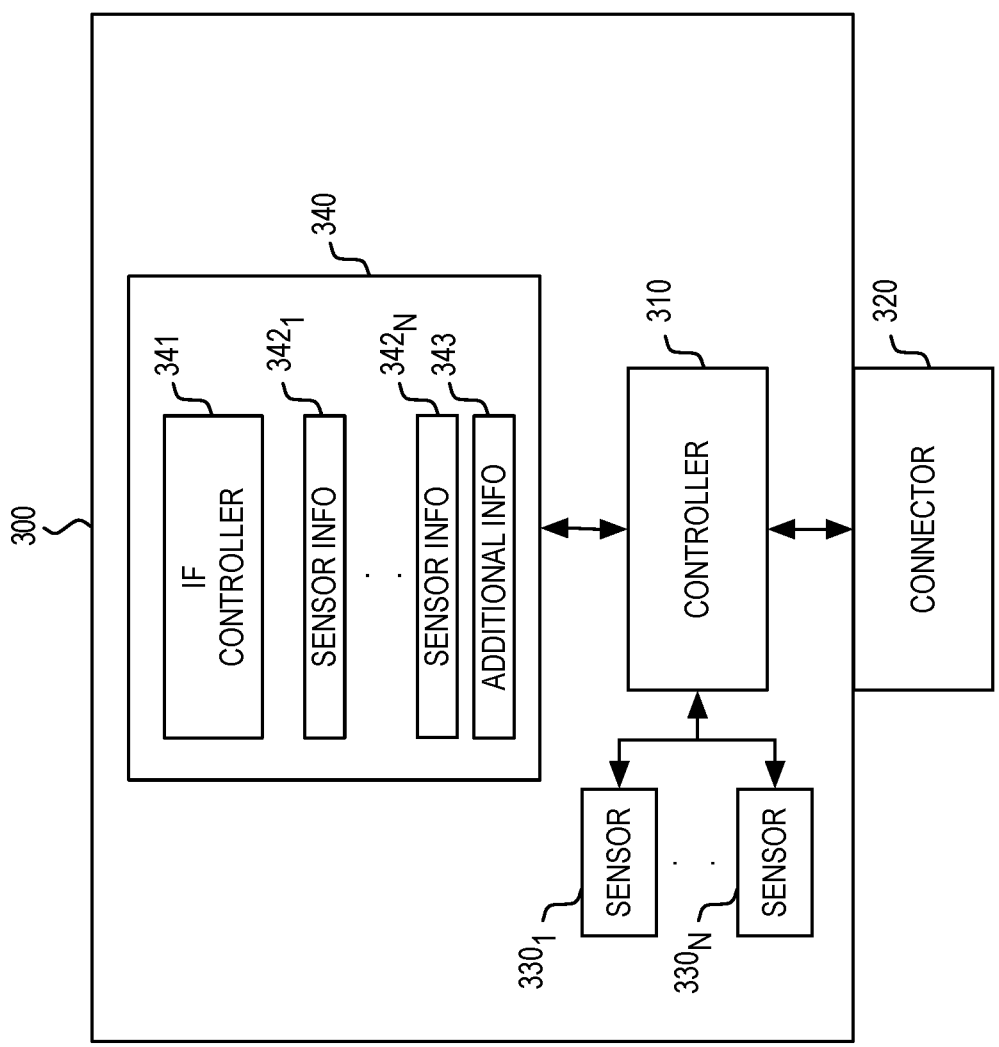
FIG. 3 illustrates an example embodiment of a bridge unit.

FIG. 3 illustrates an example embodiment of a bridge unit configured for attachment to a sensor network node, an example of which was described with reference to FIG. 2. As illustrated, bridge unit 300 includes controller 310, which communicates over a universal sensor interface with a supporting sensor network node. In one embodiment, bridge unit 300 supports the universal sensor interface with a connector 320 configured for pluggable, removable insertion into a corresponding connector interface exposed by the supporting sensor network node. In another embodiment, the bridge unit can be coupled to the connector interface exposed by the supporting sensor network node via a connector attached to a cable.

Bridge unit 300 can support a plurality of sensors $330_1$-$330_N$ such as a temperature sensor, a humidity sensor, an air quality (e.g., $CO_2$) sensor, a light sensor, a sound sensor, an accelerometer sensor, a pulse sensor, a current sensor, a voltage sensor, or any other sensor that can be incorporated in bridge unit 300. Additionally, one or more of the plurality of sensors $330_1$-$330_N$ can generate sensor data based on inputs received from an external sensor element. For example, a pulse sensor in bridge unit 300 can be configured to receive pulse signal inputs from an external sensor element and can translate the pulse signal inputs into sensor data. As would be appreciated, one or more of the plurality of sensors $330_1$-$330_N$ can be configured to operate on any type of input signals generated by an external sensor element. In various examples, the signal inputs can be generated by external sensor elements that support an occupancy sensor application, a radiation sensor application, a contact sensor application, a flow sensor application, a resource consumption application, a credential sensor application, or any other type of sensor application configured to measure a characteristic associated with a physical environment of a part of the monitored location.

Bridge unit 300 can also support one or more sensors via an interface of the bridge unit with an external controller.

Referring back to the example illustration of FIG. 1, this scenario is illustrated by bridge unit 150 interfacing with external controller 160, which supports one or more sensors 170 and by bridge unit 180 interfacing with external controller 190 that is part of control system 111. As noted, the interface between a bridge unit and an external controller can be based on an industry-defined protocol such as Modbus, BACnet, LonWorks, or any other industry-defined interface specification. It should also be noted that an external controller can be integrated with one or more sensors and/or can support the one or more sensors via a further interface.

With reference to the example embodiment of FIG. 3, bridge unit 300 can include interface section 340 to support the interface with an external controller. Interface section 340 can include an interface controller 341 that can be configured to communicate with a corresponding external controller that provides support for one or more sensors. For example, interface section 340 can be configured to communicate with an energy-monitoring meter having voltage and current sensors that can be used to determine energy-related data such as kWh, kW peak demand, power factor per phase, amps per phase and volts per phase. In this example, interface controller 341 can read data from the energy-monitoring meter using the industry-defined interface. In one scenario, the read data can include a plurality of sensor information $342_1$-$342_N$ as well as one or more elements of additional information 343. As would be appreciated, the one or more elements of additional information 343 can relate to the interface, one or more sensors, the meter, the application, or any information relevant to the resulting connection of the meter to the bridge unit. In one embodiment, the functionality performed by interface controller 341 can be performed by controller 310. As such, bridge unit can include a single controller to support the interface with a supporting sensor network node and the interface with the external controller.

Figure 4:
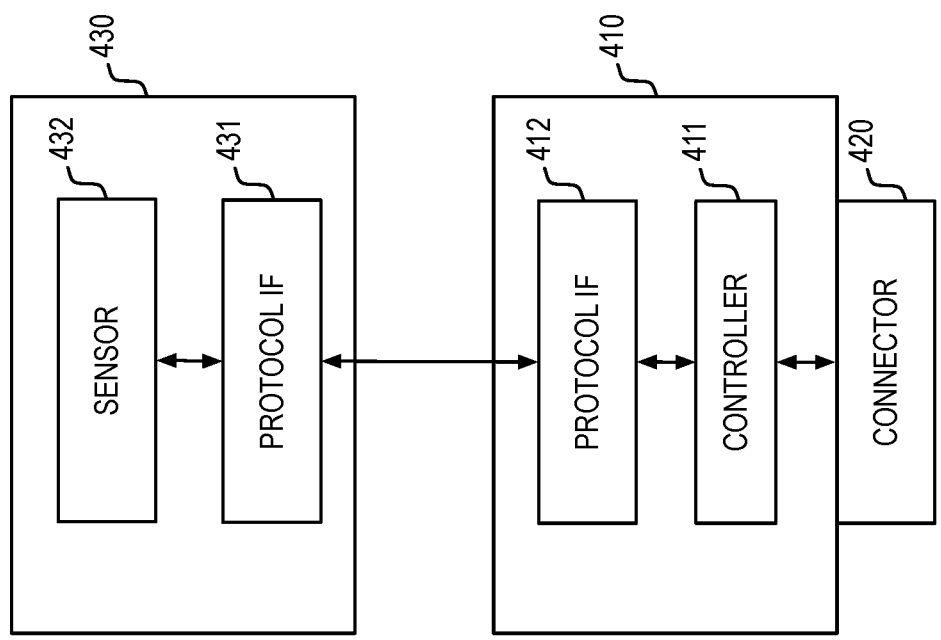
FIG. 4 illustrates an example embodiment of a bridge unit interfacing with an external controller.

FIG. 4 illustrates an example embodiment of a bridge unit interfacing with an external device that supports one or more sensors. As would be appreciated, Modbus, BACnet, LonWorks, or any other industry-defined interface can be used between the bridge unit and an external controller.

In one example, the Modbus protocol defines a message structure and format used in communication transactions. In a Modbus RTU implementation, Modbus devices can communicate using a master-slave method, in which only the master device can initiate a communications transaction with a slave device. A Modbus slave device can hold accessible data in addressable registers. A Modbus slave can contain one or more of four groups of data, including Coil status, Input status, Input registers and Holding registers. A Coil status is a single-bit flag that can represent the status of a digital output of the slave, an Input status is a single-bit flag that can represent the status of a digital input of the slave, an Input register is a 16-bit register that can store data collected by the slave device, and a Holding register is a 16-bit register that can store general-purpose data in the slave device. The various status and registers can be accessed through a specification of a data address (and range) of interest. A Modbus message can include a device address, function code (e.g., read/write Holding register), and the data address or range of addresses.

In another example, the BACnet protocol represents data in terms of objects, properties and services. An object can represent a collection of information that can be uniquely identified and accessed over a network in a standardized way. For example, an object can represent a collection of information about a physical input or output. Every object has an identifier that allows the BACnet system to identify it. The object's collection of information can represent a number of prescribed properties of the object. An object can be monitored and controlled through its properties. For example, the present-value property of an object can represent a current sensor measurement value, while the units property can identify the units of that sensor measurement value. Finally, a service is the mechanism that is used to access a property or request an action from a BACnet object. Services are how one BACnet device gets information from another device, commands a device to perform certain actions, or communicates events to other objects.

A bridge unit can be designed to support a particular data communication protocol. As illustrated in FIG. 4, bridge unit 410 includes controller 411, an example of which was described with reference to controller 310 in FIG. 3, and protocol interface 412. Protocol interface 412 can include a controller and interface hardware that enables bridge unit 410 to interface with external device 430 using a particular data communication protocol.

In one embodiment, bridge unit 410 can operate as a requesting device while external device 430 can operate as a responding device. The requests and responses would be facilitated by the data communication protocol. In one example, bridge unit 410 can be configured to transmit requests for sensor-related data from external device 430, which can represent a sensor, meter, control system, or other device that supports the data communication protocol. In one embodiment, the interface between bridge unit 410 and external device 430 can be a serial interface. In another embodiment, the interface between bridge unit 410 and external device 430 can be enabled by a TCP/IP network.

The configuration of bridge unit 410 as a requesting device can be based on configuration settings stored in a database of the operation center. In one embodiment, the configuration settings for bridge unit 410 can be stored in accordance with an identifier based on a gateway identifier, a sensor network node identifier, and a port identifier, wherein the port identifier references a particular connector interface of the sensor network node to which bridge unit 410 is connected. Based on the configuration settings stored in the database, the operation center can generate one or more configuration packets for transmission to the supporting sensor network node via the gateway. The configuration packets can be used by the supporting sensor network node to configure the operation of bridge unit 410 as a requesting device attached to the particular port of the supporting sensor network node.

In another embodiment, bridge unit 410 can operate as a responding device while external device 430 can operate as a requesting device. The requests and responses would be facilitated by the data communication protocol. In one example, bridge unit 410 can be configured to respond to requests for sensor-related data from external device 430, which can represent a control system or other device that supports the data communication protocol.

The configuration of bridge unit 410 as a responding device can be based on configuration settings stored in a database of the operation center. In one embodiment, the configuration settings for bridge unit 410 can be stored in accordance with an identifier based on a gateway identifier, a sensor network node identifier, and a port identifier, wherein the port identifier references a particular connector interface of the sensor network node to which bridge unit 410 is connected. Based on the configuration settings stored in the database, the operation center can generate one or more configuration packets for transmission to the supporting sensor network node via the gateway. The configuration packets can be used by the supporting sensor network node to configure the operation of bridge unit 410 as a responding device attached to the particular port of the supporting sensor network node.

In this embodiment, bridge unit 410 can be configured to emulate a device that can respond to a particular data communication protocol request. From one perspective, bridge unit 410 can function as a type of proxy. In this context, bridge unit 410 can stand in the place of another device in presenting information to the requesting device. The information that bridge unit 410 presents to the requesting device can be received from the operation center or another sensor network node. As such, the information provided to bridge unit 410 can be based on sensor data generated by another device, such as by sensors supported by another sensor network node. In various examples, the information can represent sensor data collected by another sensor network node, sensor data that has been processed or otherwise converted by the operation center, information generated by analytics performed by the operation center (e.g., alerts, alarms, status, control actions, or other derived data), or any other information useful to the requesting device.

As has been described, a bridge unit can collect sensor-related data from a plurality of sensors in a variety of ways, and can present sensor-related data to a requesting device. The bridge unit can communicate with a sensor network node via a universal interface.

Figure 5:
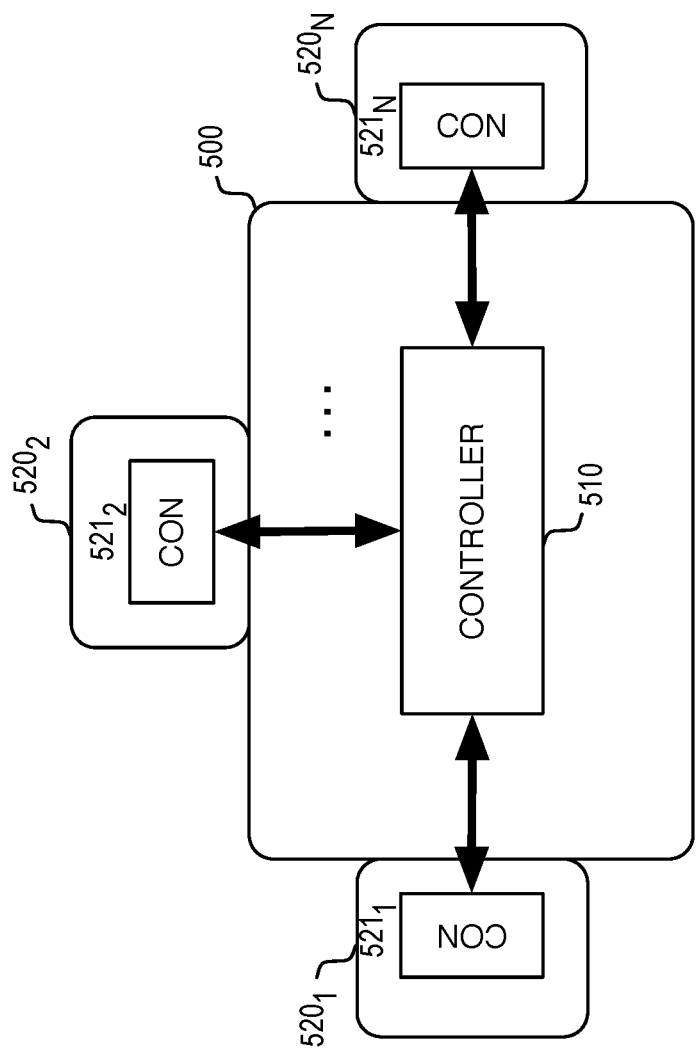
FIG. 5 illustrates an example embodiment of a sensor network node physically attached to a set of bridge units.

FIG. 5 illustrates an example data flow between a sensor network node and a plurality of bridge units. As illustrated, sensor network node 500 interfaces with a plurality of bridge units, including bridge unit $520_1$, bridge unit $520_2$, . . . , and bridge unit $520_N$. Connectors of bridge unit $520_1$, bridge unit $520_2$, . . . , and bridge unit $520_N$ are each physically attached to separate connector interfaces exposed by the housing of sensor network node 500.

The attachment of bridge unit $520_1$ to sensor network node 500 enables communication of data between controller $521_1$ and controller 510, the attachment of bridge unit $520_2$ to sensor network node 500 enables communication of data between controller $521_2$ and controller 510, . . . , and the attachment of bridge unit $520_N$ to sensor network node 500 enables communication of data between controller $521_N$ and controller 510. By these attachments, each of bridge units $520_1$, $520_2$, . . . , and $520_N$ can be coupled to sensor network node 500 via a universal sensor interface having the connectivity characteristics described above. The plug-and-play nature of the connection of bridge units to a supporting sensor network node facilitates a modular framework for the collection of sensor data at a monitored location.

Figure 6:
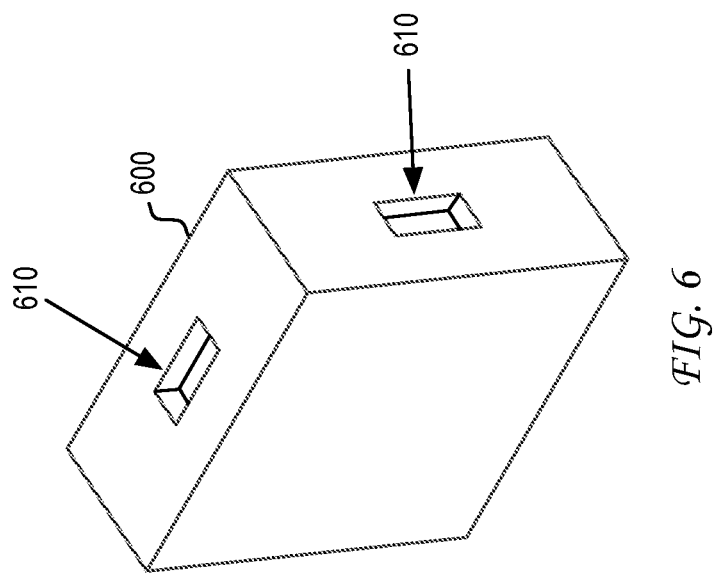
FIG. 6 illustrates an example embodiment of a housing of a sensor network node that exposes connector interfaces.

FIG. 6 illustrates an example embodiment of a housing of a sensor network node such as the example illustration of sensor network node 200 in FIG. 2. As illustrated, sensor network node 600 can have a housing configured to expose a plurality of connector interfaces 610. Each of the plurality of connector interfaces 610 can support the physical attachment of a single bridge unit. In the example illustration, each side of the housing of sensor network node 600 exposes a single connector interface 610. The housing of the sensor network node can be substantially larger than the housing of the bridge unit. This can result, for example, because sensor network node 600 can be designed with additional components such as an internal power source (e.g., battery) that can involve additional volume requirements as compared to the bridge units. It is therefore recognized that one embodiment of a sensor network node can have multiple bridge units physically attached to a single side of the sensor network node.

Figure 7:
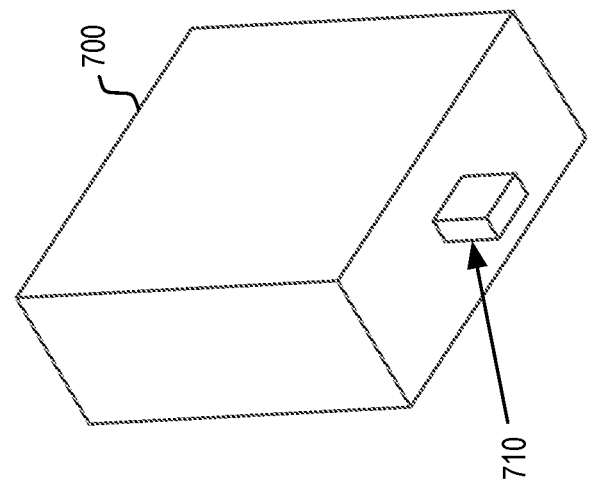
FIG. 7 illustrates an example embodiment of a housing of a bridge unit.

FIG. 7 illustrates an example embodiment of a housing of a bridge unit such as the example illustration of bridge unit 300 in FIG. 3. As illustrated, bridge unit 700 can have a housing configured to expose a connector 710. Connector 710 can be configured for pluggable, removable insertion into a corresponding connector interface 610 exposed by the housing of sensor network node 600. The connection of bridge unit 700 to sensor network node 600 via the insertion of connector 710 into connector interface 610 produces a true plug-and-play framework for the deployment of a sensor network at a monitored location.

Sensor network nodes can be rapidly deployed throughout a monitored location to facilitate the integration of the sensor network with a control system. One of the challenges of operating a sensor network is ensuring sensor data retention when disruptions in the sensor network occur. As described above with reference to FIG. 2, data collected by controller 210 based on measurements by one or more sensors supported by sensor network node 200 can be transmitted back to the gateway via the sensor network node communication infrastructure using transceiver 220. In one embodiment, sensor network node 200 includes storage memory 250 (e.g., SRAM) that can be used to backup collected sensor data when the data memory capacity of controller 210 is exceeded. In one scenario, this can occur when communication through the sensor network node communication infrastructure has been disrupted. For example, the gateway, or other sensor network node that operates as a relay, can malfunction, have poor link quality, or otherwise have diminished capacity that prevents effective operation as part of the sensor network node communication infrastructure. In one embodiment, sensor network node 200 can also include a backup battery (not shown) that enables sensor network node 200 to continue to function should wall power be disrupted due to a power outage, unplugged event, or other event that affects an external power supply for sensor network node 200. It should be noted that sensor network node 200 can also be configured to operate primarily using a battery.

In one embodiment, controller 210 can be configured to detect when communication via the sensor network node communication infrastructure has been disrupted (e.g., loss of signal, poor link quality, or other loss of connectivity indicator), and to write collected sensor data to storage memory 250 for backup storage. In one embodiment, storage memory 250 can be sized such that sensor network node 200 can continue to backup collected sensor data for a defined period of time (e.g., one day) that can cover reasonable expectations of potential vulnerabilities and recovery scenarios of the sensor network node communication infrastructure.

The backup of collected sensor data to storage memory 250 during a disruption of the sensor network node communication infrastructure ensures that all collected sensor data is retained. Loss of collected sensor data is thereby prevented. The data retention afforded by storage memory 250 can be critical to ensuring that the monitoring application can perform its analytics on a complete set of collected sensor data.

In one embodiment, the collected sensor data is stored along with timestamp information. As would be appreciated, the timestamp information can relate to a time the sensor data was generated, a time the sensor information was received at sensor network node 200, or any other time associated with the flow of sensor data to network sensor network node 200.

Figure 8:
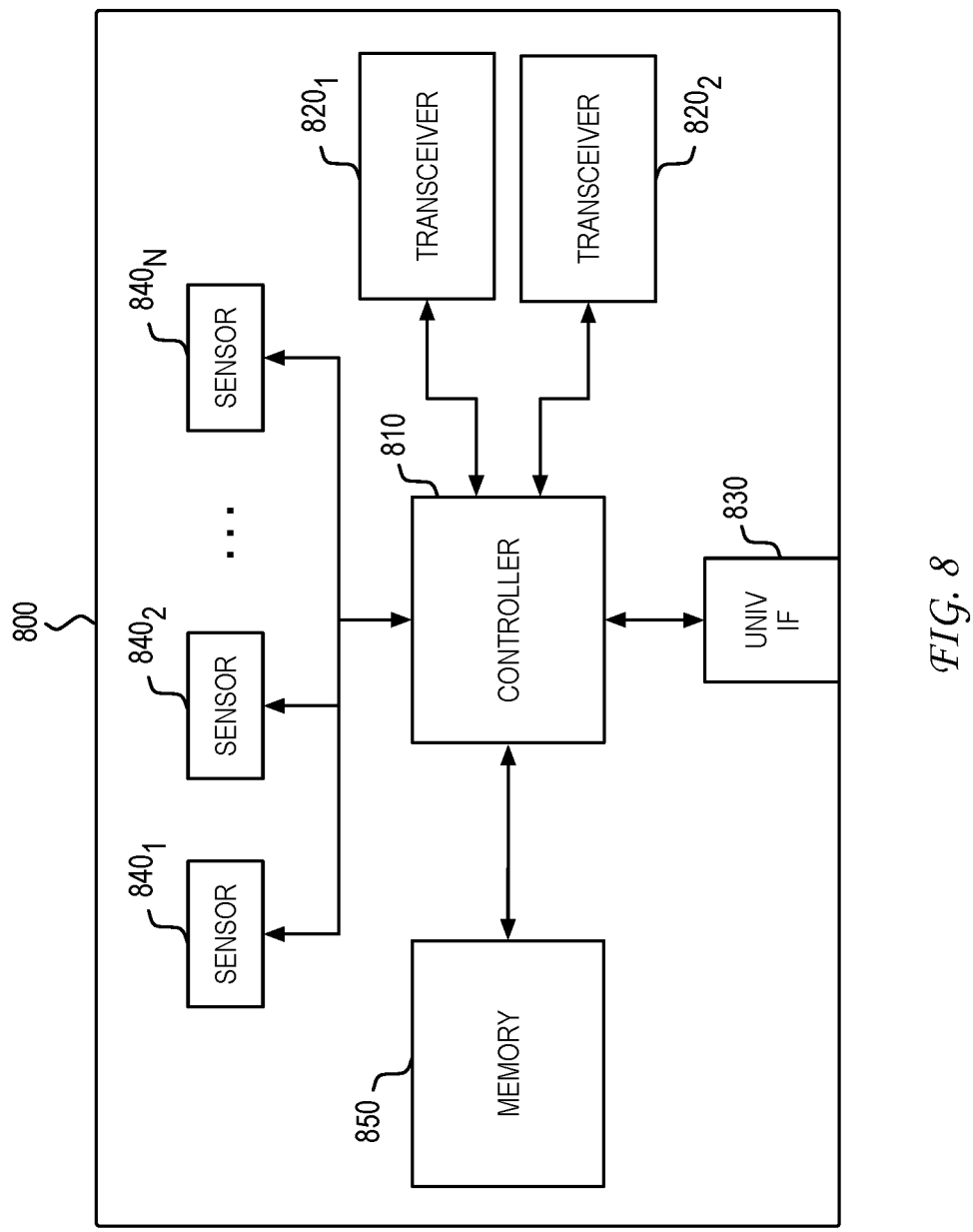
FIG. 8 illustrates an example embodiment of a gateway.

The gateway at the monitored location can also be configured to operate similarly to the sensor network node with respect to data retention. FIG. 8 illustrates an example embodiment of a gateway. As illustrated, gateway 800 includes controller 810, transceiver $820_1$ that supports a network connection with the operation center, and transceiver $820_2$ that supports communication with the sensor network node communication infrastructure. In a manner similar to a sensor network node, gateway 800 can also collect data based on measurements by a plurality of sensors $840_1$-$840_N$ that are contained within or otherwise supported by a housing of gateway 800. Gateway 800 can also collect data from a bridge unit that is connected to gateway 800 via universal sensor interface 830. In one embodiment, gateway 800 includes a single universal sensor interface 830 for limited expandability as compared to sensor network nodes.

In one embodiment, gateway 800 includes storage memory 850 (e.g., SD Card) that can be used to backup collected sensor data when the data memory capacity of controller 810 is exceeded. In one scenario, this can occur when communication through the network connection has been disrupted. In one embodiment, gateway 800 can also include a backup battery (not shown) that enables gateway 800 to continue to function should wall power be disrupted due to a power outage, unplugged event, or other event that affects an external power supply for gateway 800.

In one embodiment, controller 810 can be configured to detect when network communication with the operation center has been disrupted, and to write collected sensor data to storage memory 850 for backup storage. In one embodiment, storage memory 850 can be sized such that gateway 800 can continue to backup collected sensor data for a defined period of time (e.g., one week) that can cover reasonable expectations of potential vulnerabilities and recovery scenarios of the network connection.

The backup of collected sensor data to storage memory 850 during a disruption of the network connection ensures that all collected sensor data from the supported sensor network nodes at the monitored location is retained. Loss of collected sensor data is thereby prevented. The data retention afforded by storage memory 850 can be critical to ensuring that the monitoring application can perform its analytics on a complete set of collected sensor data. In a manner similar to the sensor network node, the collected sensor data can be stored at the gateway along with timestamp information. As would be appreciated, the timestamp information can relate to a time the sensor data was generated, a time the sensor information was received at the sensor network node, a time the sensor information was received at gateway 800, or any other time associated with the flow of sensor data to gateway 800.

Figure 9:
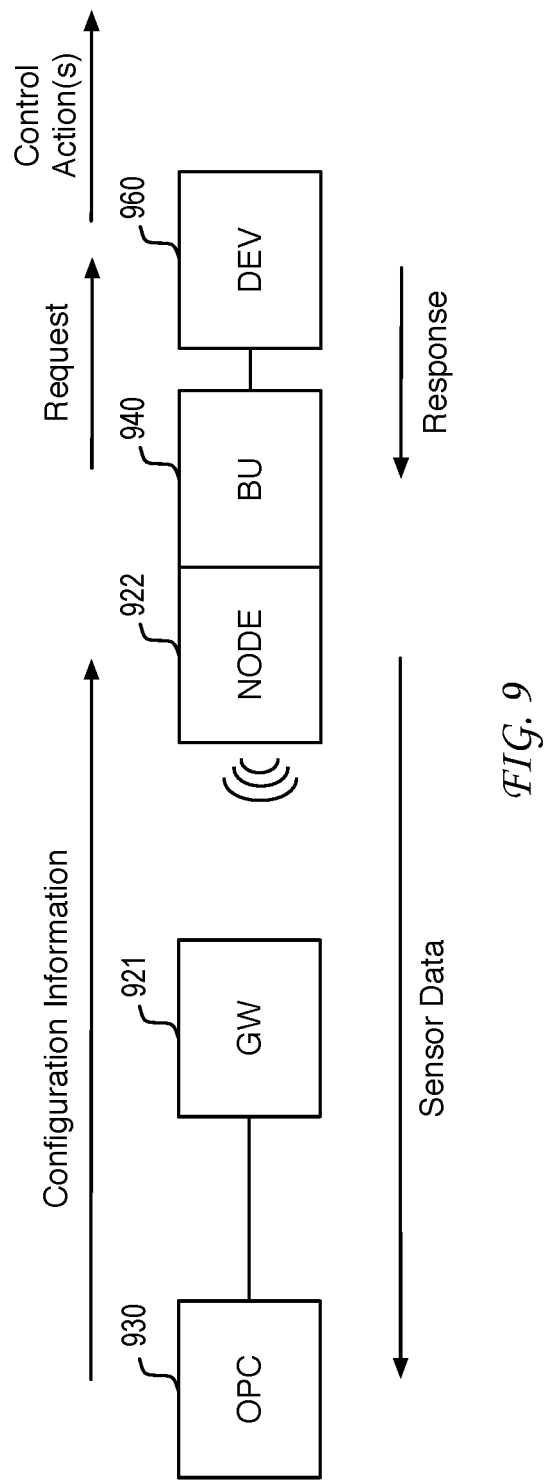
FIG. 9 illustrates an overview of an example configuration of a sensor network platform for the collection of data.

As noted, the sensor network platform of the present disclosure can be integrated with a control system at a monitored location. FIG. 9 illustrates an overview of an example configuration of a sensor network platform. In this illustration, assume that device 960 supports a communication interface based on an industry-defined protocol such as Modbus, BACnet, LonWorks, or any other industry-defined interface specification. In various embodiments, device 960 can incorporate one or more sensors directly or can be connected to further devices that incorporate one or more sensors. Regardless of the particular mechanism of supporting one or more sensors, device 960 can be configured to provide a controller function that enables an interface to the one or more sensors. An example of such a controller function was illustrated by the external controllers in the context of the high-level overview of FIG. 1.

The sensor network platform, which includes gateway device 921, sensor network node 922, and bridge unit 940, can provide a mechanism for establishing communication between operation center 930 and device 960. While the example embodiment described above includes a bridge unit physically attached to a sensor network node via a plug-and-play universal interface, such an example is not intended to be limiting. In another embodiment, the functionally of a bridge unit and a sensor network node can be incorporated into an integrated network node device.

Bridge unit 940 can be designed to support the particular communication interface supported by device 960. Requests originated by bridge unit 940 to collect particular sensor data from device 960 and/or to present particular control information to device 960 can be remotely configured. Both the collection of particular sensor data and the presentation of particular control information is performed by bridge unit 940 on behalf of operation center 930. In this embodiment, operation center 930 would not directly interact with device 960 to collect particular sensor data and/or to present particular control information. In this framework, bridge unit 940 can continue to originate a collection of particular sensor data from device 960 and/or to originate a presentation of particular control information to device 960 when communication between operation center 930 and network node 922 has been disrupted.

As illustrated in FIG. 9, configuration information can be transmitted from operation center 930 to gateway 921 via the network connection, then can be transmitted from gateway 921 to network node 922 via the sensor network node communication infrastructure. In one embodiment, the configuration information is based on configuration settings that are stored in a database of operation center 930.

The configuration information received by sensor network node 922 can be used to configure the requests to be transmitted by bridge unit 940 to device 960. Where the request relates to the collection of particular sensor data, device 960 would return a response back to bridge unit 940 that includes the requested sensor data. The sensor data can then be transmitted by sensor network node 922 to operation center 930 via gateway 921. Where the request relates to the presentation of particular control information, device 960 would generate one or more control actions based on the control information contained within the request.

Figure 10:
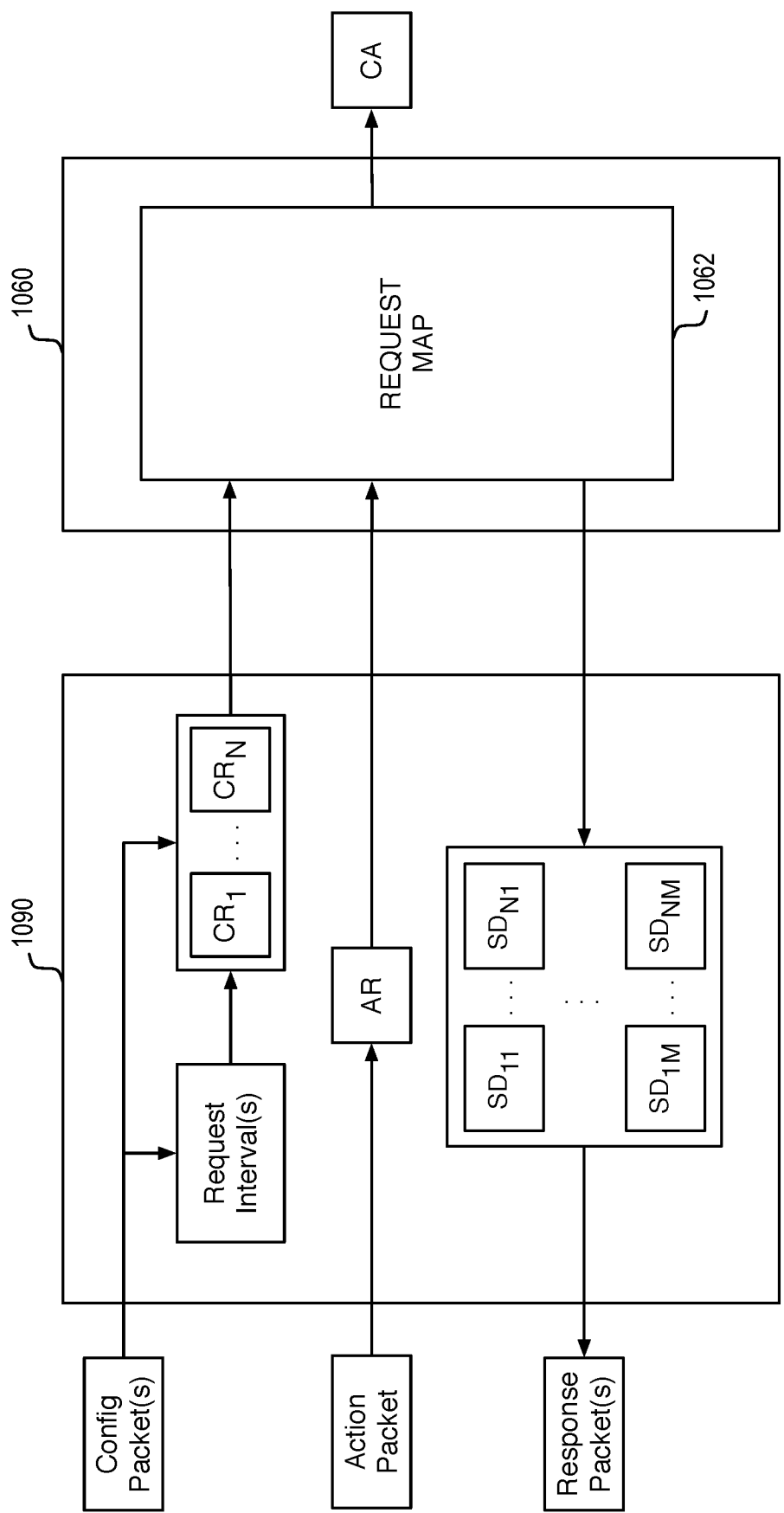
FIG. 10 illustrates an example embodiment of an interaction by a network node device interfacing with an external controller.

Having described a general framework for the configuration of requests in a sensor network node, a detailed description of an example interaction by a network node device with an external controller is now provided with reference to FIG. 10. In this example embodiment, network node device 1090 can represent the functionality produced by the combination of a sensor network node and a bridge unit. As noted above, network node device 1090 can be implemented as two separate devices that are physically attached, or can represent a single integrated device.

Network node device 1090 can be configured using configuration packets that are transmitted to network node device 1090. In general, configuration packets can be used to configure the operation of network node device 1090 in originating periodic communication transactions with device 1060. In one example, the one or more configuration packets can be used to establish a plurality of collection request definitions ($CR_1$-$CR_N$), wherein a particular collection request definition ($CR_n$) includes information that enables network node device to originate a collection request for transmission to device 1060.

In one example of a Modbus interface, the information can include the baud rate, the endianness, a device address of device 1060, a function code (e.g., read/write), an address (or range of addresses) in request map 1062 of device 1060, and any other configuration information relevant to forming a Modbus request. In one example of a BACnet interface, the information can include the baud rate, parity information, service type (e.g., read property), address, device identifier, object identifier, property identifier, and any other configuration information relevant to forming a BACnet request. As would be appreciated, the particular configuration information needed to originate a request transaction would be dependent on the particular interface supported between the network node device and the external device.

In one embodiment, the configuration packets can also be used to specify a request interval for initiation of one or more collection requests based on one or more stored collection request definitions ($CR_1$-$CR_N$). The specified request interval can identify a length of time between the transmission of collection requests based on a particular collection request definition $CR_n$. For example, a request interval can be specified such that collection requests based on the same collection request definition $CR_n$ are transmitted every X minutes. This framework can be useful where sensor data based on measurements by one or more sensors supported by device 1060 are needed every X minutes.

As would be appreciated, a request interval can be defined for application to a single collection request or can be defined for application to a group of collection requests. The particular request interval chosen would be dependent on the particular sensor application needs. In one example, a first request interval can be defined for a first set of one or more collection requests used to obtain first sensor data based on measurements by a first set of one or more sensors, while a second request interval can be defined for a second set of one or more collection requests used to obtain second sensor data based on measurements by a second set of one or more sensors. In general, a plurality of request intervals can be defined that enables a customized level of resolution granularity for different sets of sensor data based on measurements by one or more sensors.

In an example embodiment where the network node device is a combined device produced through the attachment of a bridge unit to a sensor network node, the collection request definitions ($CR_1$-$CR_N$) can be stored in the bridge unit, while the request interval(s) can be stored in the sensor network node. In this example, the sensor network node can generate a control signal when a new request is needed. The control signal would then be used to trigger the generation of a collection request based on a collection request definition $CR_n$ stored in the bridge unit. As would be appreciated, the particular form of the control signal would be implementation dependent. For example, where the bridge unit is in a sleep state between requests, the control signal can include a signal (e.g., pulling a pin HI) that can wake up the bridge unit. In another example, the control signal can also include information that enables identification, by the bridge unit, of the particular collection requests that should be generated for that particular request interval. This further specification of a subset of the collection requests for execution in a request interval would be needed if multiple request intervals have been defined. In one embodiment, the bridge unit can also be configured to send a message to the sensor network node that the bridge unit has sensor data to be delivered to the sensor network node.

The origination and transmission of a collection request based on a stored collection request definition $CR_n$ is designed to retrieve desired sensor data from device 1060. In a Modbus interface example, the collection request can include a read function code and a single address (or range of addresses) that is mapped to the desired sensor data (e.g., kWh power information). In a BACnet interface example, the collection request can include a read of a particular property of a BACnet object that is mapped to the desired sensor data.

Device 1060 can respond to a collection request by retrieving the sensor data using request map 1062 and returning the retrieved sensor data back to network node device 1090. Each collection request based on a stored collection request definition $CR_n$ can be designed to retrieve corresponding sensor data $SD_n$ using request map 1062 and to return the retrieved sensor data $SD_n$ back to network node device 1090. As illustrated in FIG. 10, sensor data $SD_{nx}$ is returned in response to the request based on the stored collection request definition $CR_n$, where "x" represents the request interval. Thus, sensor data $SD_{n1}$ is returned in response to the collection request based on the stored collection request definition $CR_n$ in the $1^{st}$ request interval, sensor data $SD_{n2}$ is returned in response to the collection request based on stored collection request definition $CR_n$ in the $2^{nd}$ request interval, . . . , and sensor data $SD_{nm}$ is returned in response to the collection request based on the stored collection request definition $CR_n$ in the $M^{th}$ request interval.

Where multiple collection requests based on multiple stored collection request definitions ($CR_1$-$CR_N$) are transmitted in a single request interval, then sensor data ($SD_1$-$SD_{N1}$) is returned in response to the multiple collection requests based on multiple stored collection request definitions ($CR_1$-$CR_N$) in the $1^{st}$ request interval, sensor data ($SD_{12}$-$SD_{N2}$) is returned in response to the multiple collection requests based on multiple stored collection request definitions ($CR_1$-$CR_N$) in the $2^{nd}$ request interval, . . . , and sensor data ($SD_{1M}$-$SD_{NM}$) is returned in response to the multiple collection requests based on multiple stored collection request definitions ($CR_1$-$CR_N$) in the $M^{th}$ request interval.

The sensor data received by network node device 1090 from device 1060 can be transmitted to the gateway device as the sensor data is received. Batch transmission of the sensor data from network node device 1090 to the gateway device is not necessarily implied based on the illustration of FIG. 10. Batch transmission of the sensor data can be used where the immediacy of the receipt of the sensor data by an operation center is neither necessary nor practical at that point in time.

In one example, network node device 1090 can store sensor data ($SD_1$-$SD_{N1}$) . . . ($SD_{1M}$-$SD_{NM}$) collected over M request intervals in a backup memory of network node device 1090 when it is determined that communication over the network node communication infrastructure has been disrupted. The storage of sensor data in the backup memory of network node device 1090 would continue until the disruption in the network node communication infrastructure has been cleared. After the disruption is cleared, batch transmission of the sensor information stored in the backup memory of network node device 1090 would commence. The collected sensor data is thereby retained notwithstanding the disruption.

Here, it should be noted that network node device 1090 can continue to originate and transmit collection requests to monitoring device 1060 during disruptions in the network node communication infrastructure. This would not be true if the requests themselves were sent over the network node communication infrastructure.

FIG. 10 illustrates the correspondence of the generation of multiple instances of a request based on a single stored collection request definition $CR_n$. As described, a stored collection request definition $CR_n$ can be established at network node device 1090 based on one or more configuration packets. The one or more configuration packets can thereby effect a remote configuration process of a network node device. As the network node device can communicate with a gateway device via wireless communication, the network node device can be configured to collect sensor data from any device installed at the monitored location. The wireless remote configuration would therefore obviate the need for incurring the time delay and expense of providing the physical cabling for connection to the device.

In addition to the collection of sensor data, network node device 1090 can also be configured to generate an action request (AR) to effect a control action at device 1060. Network node device 1090 can be configured to generate an AR based on the receipt of an action packet via the sensor network node communication infrastructure. In one embodiment, the action packet can include information (e.g., control command) to be written to device 1060. In a Modbus interface example, the AR can include a write function code, the control information, and a single address (or range of addresses) that is mapped to the desired control coil or register. In a BACnet interface example, the AR can include a write of a particular property of a BACnet object. Upon receipt of the write request, network node device 1090 can provide the control information to device 1060, wherein the control information can be used as part of a control action process at the monitored location. As illustrated, a control action (CA) can be generated by device 1060 in response to the received AR.

In general, action packets can be used to enable one-off requests. In addition to an action request, a one-off request can also relate to a one-off collection request (e.g., to effect some form of verification). As would be appreciated, the event-based action packet can be initiated in response to any event and can control network node device 1090 to originate and transmit a request to device 1060. In one embodiment, the information contained in an action packet can be deleted by network node device 1090 after execution of the request. Further, it should be noted that write requests can also be configured for transmission at periodic request intervals in a manner similar to periodic collection requests. As has been described, a bridge unit can be configured to originate requests for delivery to an external device.

Figure 11:
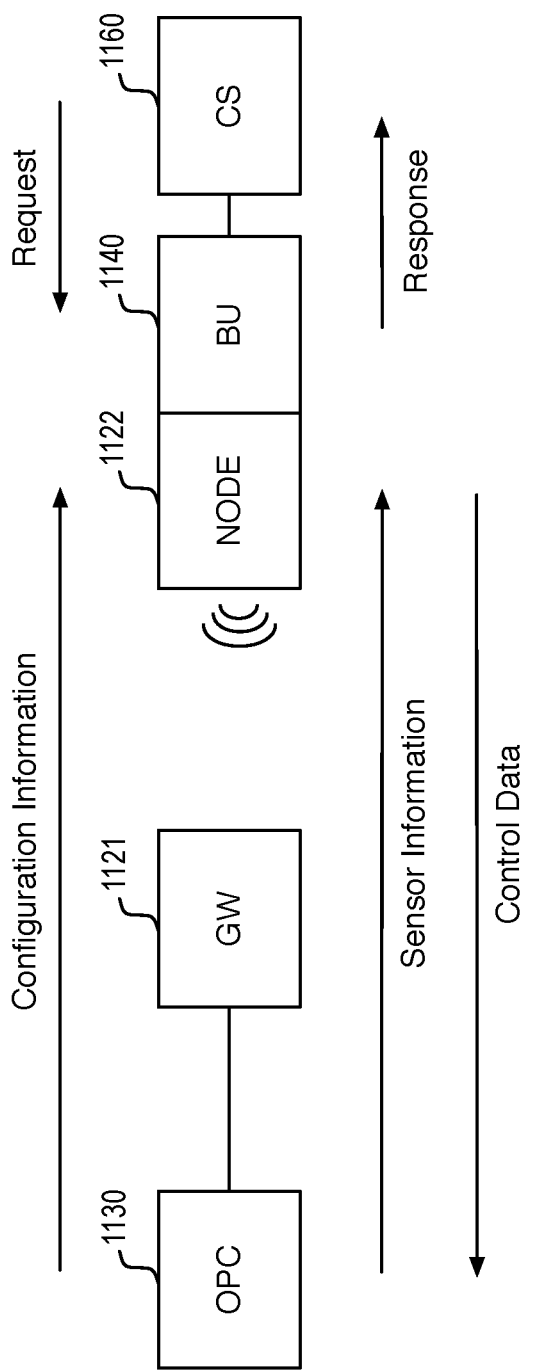
FIG. 11 illustrates an overview of an example configuration of a sensor network platform for the presentation of data.

It is also recognized that a bridge unit can be configured to respond to requests. FIG. 11 illustrates an overview of an example configuration of a bridge unit in a sensor network platform that can respond to requests from a device such as an external controller of a control system. In this illustration, assume that device 1160 supports a communication interface based on an industry-defined protocol such as Modbus, BACnet, LonWorks, or any other industry-defined interface specification. Again, while the example embodiment described above included a bridge unit physically attached to a sensor network node via a plug-and-play universal interface, such an example is not intended to be limiting. In another embodiment, the functionally of a bridge unit and a sensor network node can be incorporated into an integrated network node device.

As illustrated in FIG. 11, the sensor network platform includes gateway device 1121, sensor network node 1122, and bridge unit 1140. Bridge unit 1140 can be designed to support the particular communication interface used by device 1160. Bridge unit 1140 can be remotely configured to respond to requests generated by device 1160. The requests can relate to the collection of particular sensor information from bridge unit 1140 and/or to present particular control data to bridge unit 1140. Both the presentation of particular sensor information and the reception of particular control data can be performed by bridge unit 1140 on behalf of any device connected to the sensor network platform. An example of such an emulation function was illustrated by bridge unit 180 in the context of the high-level overview of FIG. 1.

As illustrated in FIG. 11, configuration information can be transmitted from operation center 1130 to gateway 1121 via the network connection, then can be transmitted from gateway 1121 to network node 1122 via the sensor network node communication infrastructure. In one embodiment, the configuration information is based on configuration settings that are stored in a database of operation center 1130.

The configuration information received by sensor network node 1122 can be used to configure the manner by which bridge unit 1140 would respond to requests by device 1160. Where the request relates to the collection of particular sensor information, bridge unit 1140 would return a response back to device 1160 that includes the requested sensor information. As will be described in greater detail below, the requested sensor information can be received by sensor network node 1122 from operation center 1130 via gateway 1121. In this framework, the bridge unit can be configured to present sensor information to the control system based on measurements by a sensor located anywhere in the sensor network. Where the request relates to the presentation of particular control data, bridge unit 1140 would receive the presented control data and transmit the presented control data to another sensor network node or to operation center 1130 via gateway 1121. In this framework, the bridge unit can be configured to implement controls actions anywhere in the sensor network based on the receipt of control data from the device.

Figure 12:
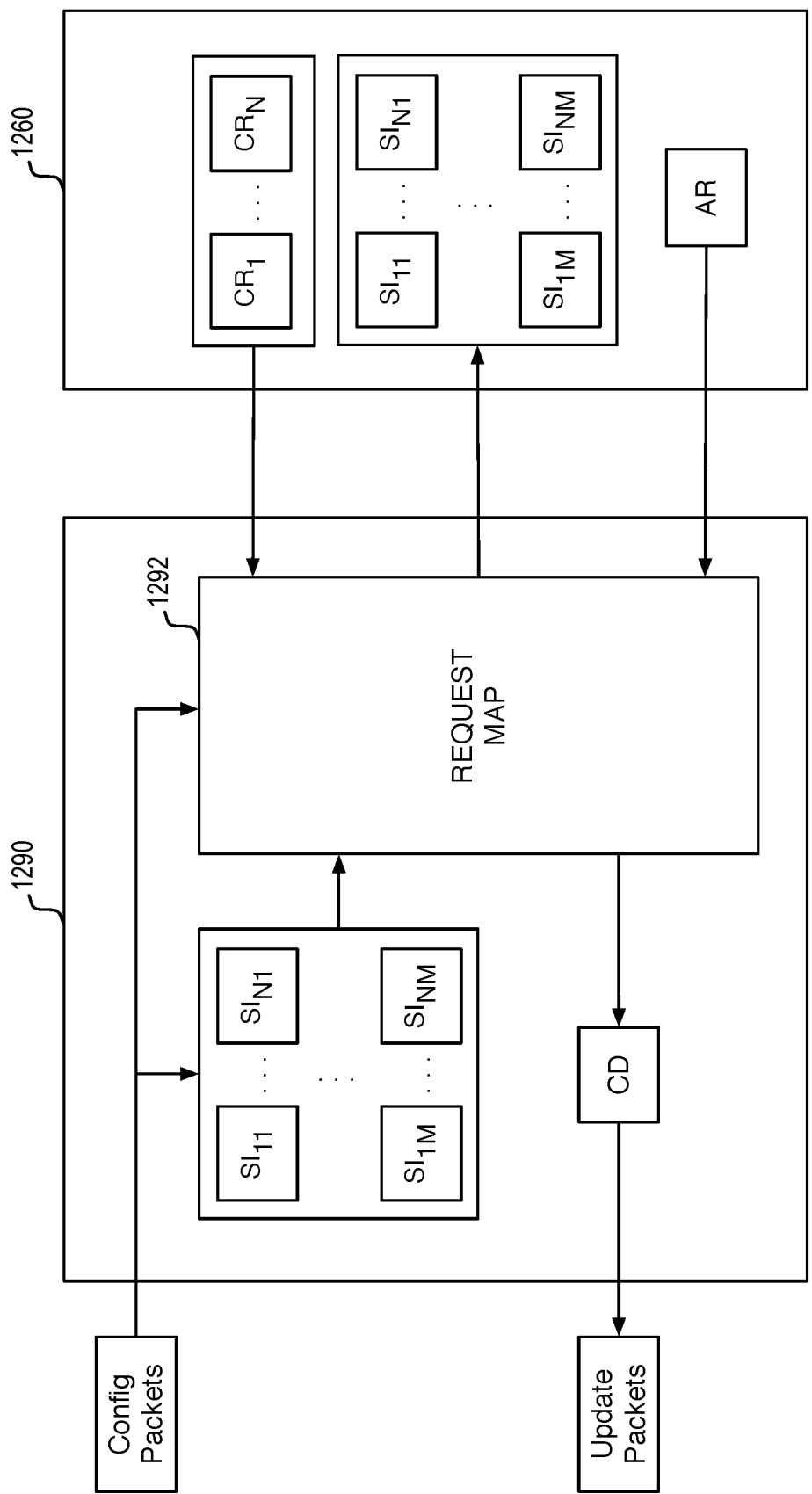
FIG. 12 illustrates an example embodiment of an interaction by a network node device interfacing with a control system.

Having described a general framework for the configuration of bridge unit 1140 in responding to requests, a detailed description of an example interaction by a network node device with a device such as a control system is now provided with reference to FIG. 12. In this example embodiment, network node device 1290 can represent the functionality produced by the combination of a sensor network node and a bridge unit. As noted above, network node device 1290 can be implemented as two separate devices that are physically attached, or can represent a single integrated device.

Network node device 1290 can be remotely configured to respond to requests by device 1260. As illustrated in FIG. 12, device 1260 can generate a plurality of collection requests ($CR_1$-$CR_N$). Each collection request $CR_n$ can represent a periodic request for particular sensor information. As would be appreciated, a one-time request can represent a special case of a periodic request, wherein only a single instance of the collection request is issued by device 1260.

Since network node device 1290 is emulating a device that generates sensor data, network node device 1290 can be configured to present customized sensor information to device 1260. Configuration of network node device 1290 can be enabled through the receipt of configuration packets via the sensor network node communication infrastructure. Configuration information contained in the configuration packets can originate at the operation center, which communicates with the gateway device at the monitored location via a network connection. In a general sense, the provision of new sensor information for presentation by network node device 1290 can be treated in a manner similar to the update of any aspect of the configuration of network node device 1290. Here, the addition of new sensor information to network node device 1290 can be viewed as a change in the way that network node device 1290 would respond to a collection request $CR_n$ by device 1260.

As such, configuration packets can be used to provide not only the customized sensor information to be presented to device 1260, but also collection request association information that would enable network node device 1290 to associate customized sensor information with potential collection requests from device 1260. In general, the configuration packets can include any configuration information that would help network node device 1290 to know how to respond to a particular request from device 1260. In FIG. 12, this association is illustrated by request map 1292, which enables network node device 1290 to associate received customized sensor information with a particular received request.

Device 1260 can be configured to generate a plurality of collection requests ($CR_1$-$CR_N$), wherein each collection request $CR_n$ can request one or more elements of sensor information. Each collection request $CR_n$ can be designed to retrieve sensor information periodically through the transmission by device 1260 of multiple instances of the same collection request CRC. Network node device 1290 would receive each instance of the collection request CRC, identify the sensor information $SI_n$ associated with the collection request $CR_n$ using request map 1292, and transmit the associated sensor information $SI_n$ back to device 1260 as part of a response. In the illustration of FIG. 12, each one of multiple collection requests ($CR_1$-$CR_N$) would produce a corresponding response having associated sensor information ($SI_1$-$SI_N$). Multiple instances of the collection requests would produce multiple instances of responses including the associated sensor information. Thus, sensor information ($SI_{11}$-$SI_{N1}$) is returned in response to the first instance of collection requests ($CR_1$-$CR_N$), sensor information ($SI_{12}$-$SI_{N2}$) is returned in response to the second instance of collection requests ($CR_1$-$CR_N$), . . . , and sensor information ($SI_{1M}$-$SI_{NM}$) is returned in response to the $M^{th}$ instance of collection requests ($CR_1$-$CR_N$).

Ideally, sensor information is always made available to network node device 1290 just prior to the receipt by network node device 1290 of an associated collection request. This condition may not always be true and is a consequence of the fact that network node device 1290 is emulating another device. Effectively, the collection requests submitted by device 1260 are sampling sensor information that is continually changing at network node device 1290. Where the configuration packets update sensor information at network node device 1290 more frequently than collection requests are received from device 1260, then some sensor information updates can be missed by the collection requests. This may not necessarily be a problem because the frequency of collection requests may be enough to suit the needs of device 1260. Where the configuration packets update sensor information at network node device 1290 less frequently than collection requests are received from device 1260, then some sensor information returned to control system 1260 can represent "stale" sensor information that has previously been received.

In one embodiment, network node device 1290 can be configured to delete sensor information after the sensor information has been presented to device 1260 in response to a collection request. Where new sensor information has not been received prior to a subsequent collection request, network node device 1290 can be configured to return an exception response, which would alert device 1260 that new sensor information is not available. Device 1260 could then accelerate the queuing of a new instance of the collection request for that sensor information. In one embodiment, network node device 1290 can also be configured to return an exception response when a disruption in the sensor network node infrastructure has been detected, which would preclude the receipt of sensor information updates from the operation center.

In another embodiment, network node device 1290 could store timestamp information with sensor information such that the time stamp information can be returned to device 1260 in response to a collection request. This timestamp information would then provide device 1260 with an understanding of the relative recency of the sensor information in the context of a stream of sensor information. As would be appreciated, the timestamp information can relate to a time the sensor information was generated, a time the sensor information was received at the operation center, a time the sensor information was received at network node device 1290, or any other time associated with the flow of the sensor information to network node device 1290.

Network node device 1290 can also be configured to respond to action requests received from device 1260. While an action request can be produced periodically to perform a series of repeated actions, the description below describes a one-off action request. As would be appreciated, periodic action requests would represent multiple instances of the same action request and can be handled accordingly by network node device 1290 as described below.

An action request (AR) can be transmitted to effect a control action anywhere in the sensor network. Significantly, the particular location of the control action can be remote from network node device 1290. Network node device 1290 happens to be a recipient of the action request, but need not be the actual executor of the control action in response to the action request. Network node device 1290 can relay control data to another sensor network node or back to the operation center via the gateway device, wherein the operation center can then send control information (e.g., action packet described with reference to FIG. 9), which is based on the control data, to another network node device for execution of the control action. In one embodiment, the bridge unit can be configured to send a message to the sensor network node that the bridge unit has received an action request to be delivered to the sensor network node.

As illustrated in FIG. 12, one or more configuration packets can be used to provide action request association information that would enable network node device 1290 to transmit particular control data (CD) to the operation center in response to a received action request (AR). In one embodiment, request map 1292 can represent a memory mapping that associates control data to be transmitted with data requested by device 1260 to be written. In one embodiment, the write request can include information that enables identification of a particular actuator device in the sensor network and an action to be taken by the actuator device.

In one embodiment, the CD that is transmitted to the operation center can be included in an update packet that is returned to the gateway device via the sensor network node communication infrastructure. Contents of the update packet can then be transmitted by the gateway device to the operation center to alert the operation center of a change in the configuration of network node device 1290. The reported change in configuration of network node device 1290 can then produce a response by the operation center in implementing a control action by an actuator device in the sensor network.

Figure 13:
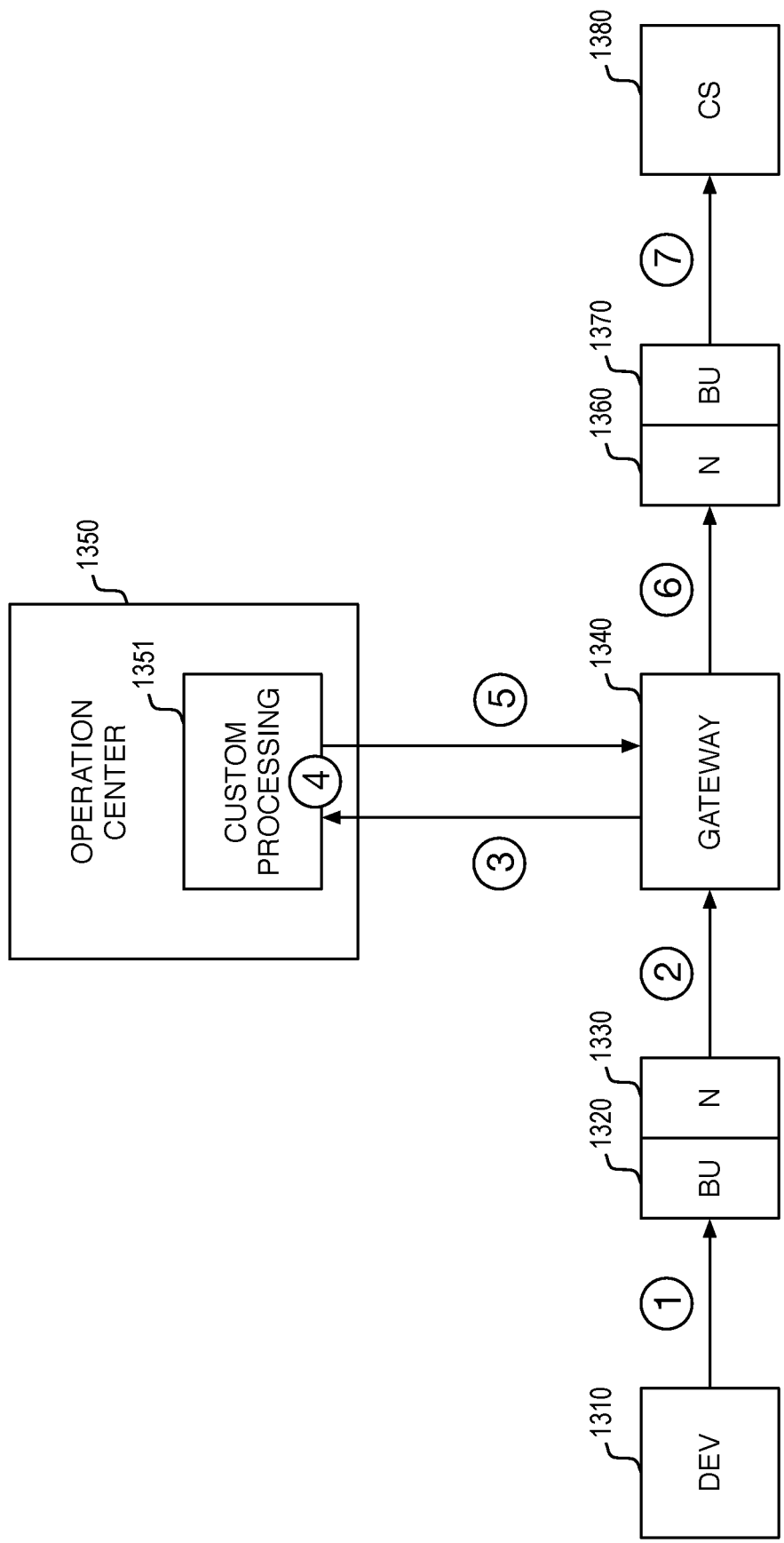
FIG. 13 provides an example illustration of an operation of a sensor network that collects sensor data and presents sensor information to a control system.

Having described an example interaction by a network node device with external devices, a description of an example end-to-end data flow is now provided. FIG. 13 provides an example illustration of an operation of a sensor network that collects sensor data from device 1310 and presents sensor information based on the collected sensor data to control system 1380.

Device 1310 can generate sensor data based on measurements performed by one or more supported sensors. The generated sensor data can then be made available to bridge unit 1320. This process is illustrated as data flow "1". In one example, the provision of sensor data from device 1310 to bridge unit 1320 can be performed via an external interface based on an industry-defined protocol. In another example, the sensor data is made available via intra-device communication.

Bridge unit 1320 can leverage a sensor network node communication infrastructure formed by a plurality of sensor network nodes to communicate the collected sensor data to gateway 1340. Entry into the sensor network node communication infrastructure is through sensor network node 1330. In one embodiment, bridge unit 1320 is attached to sensor network node 1330 via a plug-and-play universal sensor interface. The communication through the sensor network node communication infrastructure is illustrated as data flow "2". The sensor network node infrastructure can be based on wired and/or wireless communication, and can include communication through one or more intervening nodes between sensor network node 1330 and gateway 1340. In one example, the sensor data is communicated through a wireless mesh network formed by a plurality of wireless sensor network nodes.

Gateway 1340 can transmit the data received from the sensor network node communication infrastructure to operation center 1350 via a network connection. This communication is illustrated as data flow "3". Operation center 1350 can be located external to the monitored location. In various embodiments, the network connection can be based on wired and/or wireless communications.

Having been transported offsite from the monitored location, the collected sensor data can now be processed for presentation to control system 1380. In one embodiment, the processing is performed by custom processing element 1351, which can be enabled by one or more servers at operation center 1350 under the control of configuration settings established by a user. In one embodiment, the processing can include one or more conversion functions defined by the configuration settings. These one or more conversion functions may not be supported by device 1310.

In general, the customized information can be designed to produce actionable information for use by control system 1380. Operation center 1350 can be configured to process collected sensor data to produce any form or type of information needed by control system 1380. Thus, the particular processing performed by operation center 1350 would be dependent on the needs and capabilities of control system 1380 and the sensor application implemented.

The production, by custom processing element 1351, of sensor information from collected sensor data is illustrated as data flow "4". The custom-processed sensor information can now be returned to the monitored location for presentation to control system 1380. Operation center 1350 can be configured to transmit the custom-processed sensor information back to gateway 1340 via the network connection. This communication is illustrated as data flow "5".

Gateway 1340 would then transmit the custom-processed sensor information to bridge unit 1370 via the sensor network node communication infrastructure formed by the plurality of sensor network nodes. This communication through the sensor network node communication infrastructure is illustrated as data flow "6". Again, the communication through the sensor network node communication infrastructure can include communication through one or more intervening nodes between gateway 1340 and sensor network node 1360.

The custom-processed sensor information can exit from the sensor network node communication infrastructure through sensor network node 1360 and be passed to bridge unit 1370. In one embodiment, bridge unit 1370 is attached to sensor network node 1470 via a plug-and-play universal sensor interface.

Bridge unit 1370 can now present the custom-processed sensor information to control system 1480. This presentation is illustrated as data flow "7". In one embodiment, the presentation of custom-processed sensor information from bridge unit 1470 to control system 1480 can be performed via an external interface based on an industry-defined protocol. In one example, the information (e.g., sensor data) can be presented to control system 1380 in the context of a response to a read request from control system 1380. In another example, the information (e.g., control data) can be presented to control system 1380 in the context of a request to write information to control system 1380. As the example data flow illustrates, custom-processed sensor information can be generated from sensor data collected by device 1310 then presented to control system 1380 through a known interface supported by control system 1380.

Figure 14:
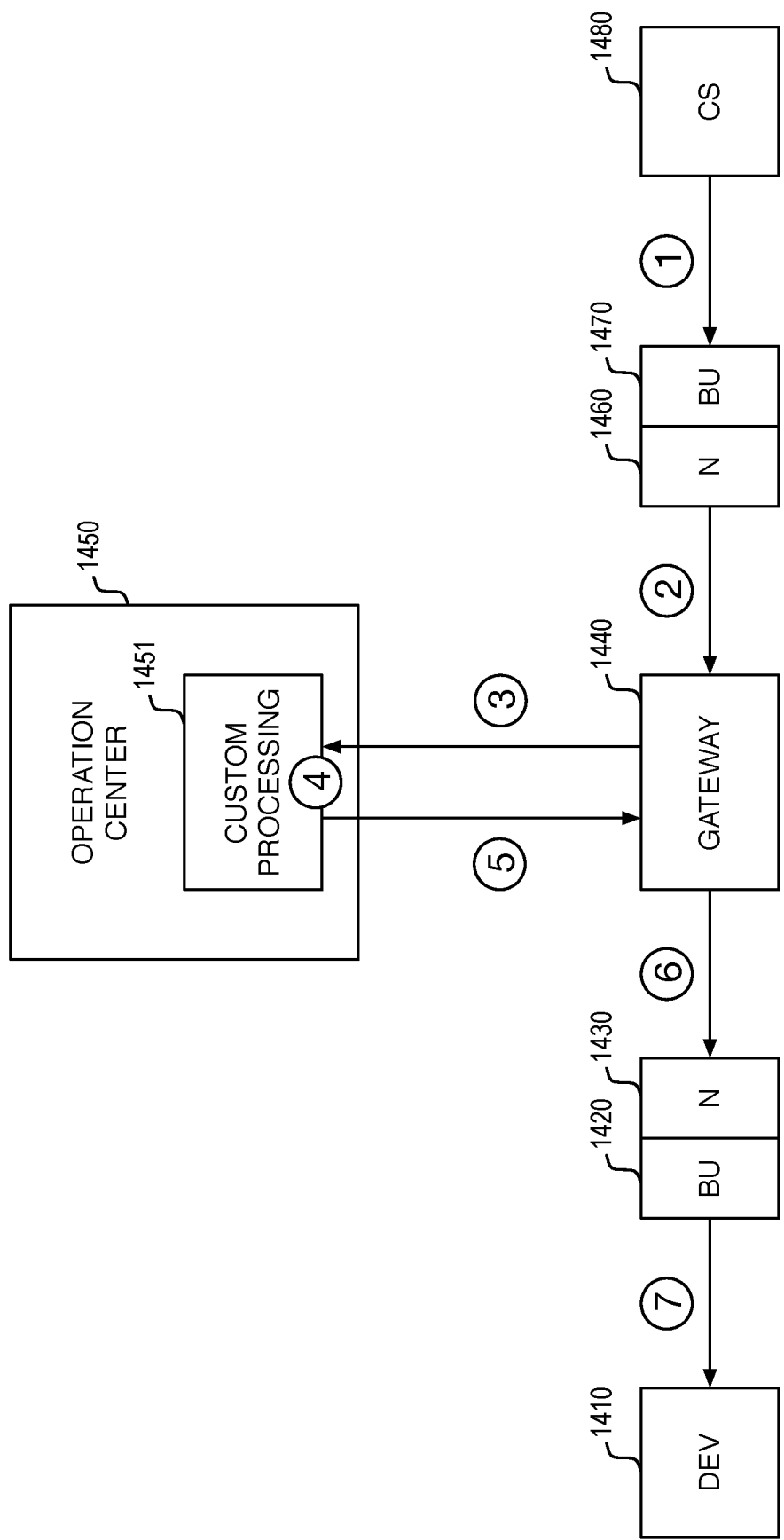
FIG. 14 provides an example illustration of an operation of a sensor network that receives control data from a control system and presents control information to an actuator device.

FIG. 14 provides an example illustration of an operation of a sensor network that receives information from control system 1480 and can present control information based on the received information to device 1410. In one example, the control action is based on control data that is received by bridge unit 1470 from control system 1480. The control data can be generated based on analytics performed by control system 1480 on sensor data available to control system 1480. The generated control data can then be provided to bridge unit 1570 as part of a request to write information to bridge unit 1470. In another example, the control action is based on sensor data that is received by bridge unit 1470 from control system 1480 as part of a request to read information from control system 1480. In this example, the retrieved sensor data can be processed by customer processing 1451 in operation center 1450 to produce control information that can be presented to device 1410 to initiate a control action by an actuator supported by device 14101.

The provision of information to bridge unit 1470 is illustrated as data flow "1". In one example, the provision of information from control system 1480 to bridge unit 1470 can be performed via an external interface based on an industry-defined protocol.

Bridge unit 1470 can leverage a sensor network node communication infrastructure formed by a plurality of sensor network nodes to communicate the control data to gateway 1440. Entry into the sensor network node communication infrastructure is through sensor network node 1460. In one embodiment, bridge unit 1470 is attached to sensor network node 1460 via a plug-and-play universal sensor interface. The communication through the sensor network node communication infrastructure is illustrated as data flow "2". The sensor network node infrastructure can be based on wired and/or wireless communication, and can include communication through one or more intervening nodes between sensor network node 1460 and gateway 1440. In one example, the information is communicated through a wireless mesh network formed by a plurality of wireless sensor network nodes.

Gateway 1440 can transmit the information received from the sensor network node communication infrastructure to operation center 1450 via a network connection. This communication is illustrated as data flow "3". Operation center 1450 can be located external to the monitored location. In various embodiments, the network connection can be based on wired and/or wireless communications.

Having been transported offsite from the monitored location, the collected information can now be processed for presentation as control information to device 1410. In one embodiment, the processing is performed by custom processing element 1451, which can be enabled by one or more servers at operation center 1450 under the control of configuration settings established by a user. In one embodiment, the processing can include one or more analytic functions defined by the configuration settings. These one or more conversion functions may not be supported by control system 1480. The production, by custom processing element 1451, of control information from information received from control system 1480 is illustrated as data flow "4". The custom-processed control information can now be returned to the monitored location for presentation to device 1410. Operation center 1450 can be configured to transmit the custom-processed control information back to gateway 1440 via the network connection. This communication is illustrated as data flow "5".

Gateway 1440 would then transmit the custom-processed control information to bridge unit 1420 via the sensor network node communication infrastructure formed by the plurality of sensor network nodes. This communication through the sensor network node communication infrastructure is illustrated as data flow "6". Again, the communication through the sensor network node communication infrastructure can include communication through one or more intervening nodes between gateway 1440 and sensor network node 1430.

The custom-processed control information can exit from the sensor network node communication infrastructure through sensor network node 1430 and be passed to bridge unit 1420. In one embodiment, bridge unit 1420 is attached to sensor network node 1430 via a plug-and-play universal sensor interface.

Bridge unit 1420 can now present the custom-processed control information to actuator device 1410. This presentation is illustrated as data flow "7". In one embodiment, the presentation of custom-processed control information from bridge unit 1420 to actuator device 1410 can be performed via an external interface based on an industry-defined protocol. As this example data flow illustrates, custom-processed control information can be generated from information received from control system 1480 then presented to actuator device 1410 through a known interface supported by device 1410.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A device, comprising
   a Building Automation and Control Network (BACnet) communication protocol interface that enables the device to communicate with a second device in a Building Management System (BMS) network in a building in which the device is installed, the BMS network connected to a plurality of sensor devices installed in the building and obtaining a plurality of time based series of sensor data generated by the plurality of sensor devices;
   a transceiver that receives a configuration update packet, the configuration update packet including configuration information that is generated by a host system that is remote from the building; and
   a controller that configures the device using the configuration information contained in the configuration update packet to periodically request sensor data from each of the plurality of time based series of sensor data from the second device using the BACnet communication protocol interface,
   wherein the sensor data received from the second device in response to the periodic requests are transmitted to the host system by the transceiver.

2. The device of claim 1, wherein the transceiver is a wireless transceiver.

3. The device of claim 1, wherein the configuration update packet is received from a gateway device.

4. The device of claim 3, wherein the gateway device is installed in the building.

5. The device of claim 4, wherein the transceiver is further configured to receive sensor based information that has been processed by the host system and to present the sensor based information to the second device via the BACnet communication protocol interface.

6. The device of claim 5, wherein the sensor based information is a control signal configured to change a state of an actuator device in the building.

7. The device of claim 1, wherein the device is configured to receive baud rate information and parity information, the baud rate information and the parity information enabling the device to form a message for communication using the BACnet data communication protocol interface.

8. The device of claim 1, wherein the second device is part of a building control system that controls a Heating, Ventilation and Air Conditioning (HVAC) system.

9. A method, comprising
receiving, by a transceiver in a device installed in a building, a configuration update packet that includes configuration information generated by a host system that is remote from the building;
configuring the device, by a controller in the device, using the configuration information contained in the configuration update packet to periodically request sensor data from each of a plurality of time based series of sensor data from a second device using a Building Automation and Control Network (BACnet) communication protocol interface in the device, wherein the second device is in a Building Management System (BMS) network in the building, the BMS network connected to a plurality of sensor devices installed in the building and obtaining the plurality of time based series of sensor data generated by the plurality of sensor devices; and
transmitting, by the transceiver, the sensor data received from the second device in response to the periodic requests to the host system.

10. The method of claim 9, wherein the transceiver is a wireless transceiver.

11. The method of claim 9, wherein the configuration update packet is received from a gateway device.

12. The method of claim 11, wherein the gateway device is installed in the building.

13. The method of claim 12, further comprising receiving, by the transceiver, sensor based information that has been processed by the host system and to present the sensor based information to the second device via the BACnet communication protocol interface.

14. The method of claim 13, wherein the sensor based information is a control signal configured to change a state of an actuator device in the building.

15. The method of claim 9, wherein the device is configured to receive baud rate information and parity information, the baud rate information and the parity information enabling the device to form a message for communication using the BACnet data communication protocol interface.

16. The method of claim 9, wherein the second device is part of a building control system that controls a Heating, Ventilation and Air Conditioning (HVAC) system.

17. A device, comprising
a Building Automation and Control Network (BACnet) communication protocol interface that enables the device to communicate with a second device in a Building Management System (BMS) network in a building in which the device is installed;
a transceiver that receives a configuration update packet, the configuration update packet including configuration information that is generated by a host system that is remote from the building; and
a controller that configures the device using the configuration information contained in the configuration update packet to periodically request, from the second device, sensor data from each of a plurality of time based series of sensor data using the BACnet communication protocol interface.

18. The device of claim 17, wherein the sensor data received from the second device in response to the periodic requests are transmitted to the host system by the transceiver.

19. The device of claim 17, wherein the configuration update packet is received from a gateway device.

20. The device of claim 17, wherein the transceiver is further configured to receive sensor based information that has been processed by the host system and to present the sensor based information to the second device via the BACnet communication protocol interface.

* * * * *